(12) United States Patent
Hill et al.

(10) Patent No.: US 8,662,228 B2
(45) Date of Patent: Mar. 4, 2014

(54) FREE-TO-LEAN THREE-WHEELED PASSENGER VEHICLE, POWER PLANT CONTROLLER AND BODY THEREFOR

(75) Inventors: Robert B. Hill, Portland, OR (US); Fred Lux, Aloha, OR (US); Timothy Michael Miller, Portland, OR (US); Edmund Jerome Stilwell, Oregon City, OR (US)

(73) Assignee: Green Lite Motors Corporation, Portland, OR (US)

( * ) Notice: Subject to any disclaimer, the term of this patent is extended or adjusted under 35 U.S.C. 154(b) by 20 days.

(21) Appl. No.: 12/930,871

(22) Filed: Jan. 19, 2011

(65) Prior Publication Data

US 2012/0181765 A1     Jul. 19, 2012

(51) Int. Cl.
*B62D 61/06* (2006.01)

(52) U.S. Cl.
USPC .......................................... 180/210

(58) Field of Classification Search
USPC ................. 180/210, 211, 213, 214, 215, 216; 280/124.103, 124.106
See application file for complete search history.

(56) References Cited

U.S. PATENT DOCUMENTS

| | | | | |
|---|---|---|---|---|
| 4,903,857 | A * | 2/1990 | Klopfenstein | 280/267 |
| 7,487,985 | B1 | 2/2009 | Michell | |
| 7,591,337 | B2 | 9/2009 | Suhre et al. | |
| 7,647,999 | B2 * | 1/2010 | Geiser | 180/210 |
| 7,648,148 | B1 * | 1/2010 | Mercier | 280/124.103 |
| 2003/0102176 | A1 * | 6/2003 | Bautista | 180/210 |
| 2007/0075517 | A1 | 4/2007 | Suhre et al. | |
| 2010/0164189 | A1 * | 7/2010 | Buma | 280/5.521 |

OTHER PUBLICATIONS

Paul Crowe, "Harley Davidson Leaning Trike Patent Application", www.thekneeslider.com, Jun. 1, 2007, unknown (27 pages).
Mike Hanlon, "Mercedes-Benz F 300 Life-Jet; the three-wheeled driving machine", www.gizmag.com, Dec. 21, 2004, unknown (4 pages).
Paul Crowe, "Carver and CLEVER Tilting 3 Wheelers", www.thekneeslider, Apr. 27, 2006, unknown (17 pages).
Mike Hanlon, "Naro tilting car concept", www.gizmag.com, Dec. 28, 2004, unknown (4 pages).
Anon, "Wiki: Tilting three wheeler", wapedia.mobi, Feb. 14, 2011, unknown (6 pages).
Anon, "Instantiations of teh Dream: TTW—Tilting Three Wheelers/Motorized TTWs", www.maxmatic.com, Nov. 4, 2006, unknown (15 pages).

* cited by examiner

*Primary Examiner* — Faye M. Fleming

(57) ABSTRACT

A three-wheeled leaning passenger vehicle comprises a frame rigidly mounting a passenger seat; a rear wheel rotatably mounted on the frame in a rearward region thereof; a frame-mounted rotary drive cooperatively coupled with the rear wheel for rotation of the rear wheel relative to the frame; and a frame-mounted coast/steer system including two front wheels freely rotatable relative to the frame in a forward region thereof, and a handlebar coupled with the two front wheels for turning the two front wheels in a plane defined by their rotational axes substantially parallel with one another to corner, the vehicle being configured to substantially freely lean left and right in a natural response to a driver thereof in the driver seat steering the vehicle and leaning respectively left and right, and, alternatively or additionally, to have controlled leaning in response to a hydraulically or otherwise provisioned front-wheel suspension subsystem.

22 Claims, 17 Drawing Sheets

FREE-TO-LEAN THREE-WHEELED PASSENGER VEHICLE, POWER PLANT CONTROLLER AND BODY THEREFOR

FIELD OF THE INVENTION

The invention relates generally to the field of motor vehicles. More particularly, the invention relates to a powered leaning passenger vehicle with a selectively active lean controller.

BACKGROUND OF THE INVENTION

Conventional passenger vehicles are of two types: two-wheeled motorcycles that lean into corners in what will be referred to herein as a G-force-neutralizing lean and four-wheeled cars that do not lean into corners in what will be referred to herein as a G-force-subject non-lean. Of course, those of skill in the art will appreciate that, below a certain cornering speed characterized by low G forces, motorcycles typically lean very little. Those of skill in the art also will appreciate that four-wheeled cars at sufficiently high cornering speeds actually tend to lean away from the corner and subject passengers to lateral forces. Finally, those of skill in the art will appreciate that a few three-wheeled cars are known including, for example, the British version of the Isetta (circa 1950s), which were characterized by the same G-force-subject non-lean as their four-wheeled counterparts.

Recently, a three-wheeled, one-passenger trike or motorcycle was described in U.S. Pat. No. 7,591,337 B1 entitled LEANING SUSPENSION MECHANICS to Suhre, et al. issued Sep. 22, 2009 and assigned to Harley Davidson Motor Company Group, Inc. The vehicle, which will be described herein as a trike, includes a frame, a rear drive wheel, conventional gasoline-fueled internal combustion engine, and two front wheels with a leaning suspension system. The suspension system includes one or more lean actuators configured to extend and retract to force-tilt the front wheels and to lean the motorcycle, responsive to a driver's pivotal rotation of the steering mechanism, e.g. the handlebars, through a corner. The actuators "are controlled by the leaning suspension control system that monitors at least one characteristic of the trike such as handlebar position (i.e. steering angle), speed, acceleration, etc." Thus, the leaning of the trike described in the recent publication is understood to be actively controlled by the trike's leaning suspension control system, with said system applying a force to push the vehicle's center of gravity in the direction of the turn, thus leaning the vehicle into a turn, hereinafter referred to as 'forced-leaning'.

This forced-leaning is very different from the leaning which occurs in a typical motorcycle, wherein the driver initially counter-steers (pushing the handlebars in the opposite direction of a turn), moving the contact patch of the front wheel out from under the vehicle, causing the vehicle to begin to naturally 'fall' into the turn due to gravity, at which point the driver adjusts the steering toward the direction of the turn as appropriate to maintain balance at a lean angle appropriate for the turn, speed, slope of the road, etc. This style of leaning is hereinafter referred to as 'natural leaning,' where the vehicle is 'free to lean' according to the driver's steering inputs, weight shifting, gravity, momentum and other forces.

Several leaning vehicles and concepts (such as the Mercedes LifeJet, the Persu (with technology licensed from Carver), the Clever, the Dagne, and the TTW Italia) use a complex system of forced-leaning or 'active tilt,' hydraulically (or otherwise mechanically) pushing the vehicle into turns, estimating the ideal lean based on speed and steering and other sensors. This forced-leaning approach presents three key challenges. First, it requires energy (reducing efficiency) for every turn, pushing (leaning) the vehicle such that a substantial portion of the mass of the vehicle is leaned into the turn—using the hydraulic pump or other mechanical means. Second, the timing difference (even tenths of a second) and imprecision in the forced-lean angle can make passengers feel queasy (like an amusement park ride). Third, the systems are complex and robustly built (as the vehicles are generally un-drivable without such systems), thus making the systems expensive and heavy (again reducing efficiency).

Mighell in U.S. Pat. No. 7,487,985 B1 entitled TILTING WHEELED VEHICLE issued Feb. 10, 2009 even more recently taught tilting idle or steering wheel linkage including kingpins at the ends of arms, the tilting linkages being within cylinders defined by the wheels' hubs. Mighell taught nothing about how to solve the problem of front-wheel oscillation.

In contrast, the free-to-lean design described herein enables the vehicle to lean smoothly and naturally, like a motorcycle, always on the correct lean angle, using no energy, and it then gently holds the vehicle upright at stops and low speeds, using almost no energy. (Generally, when the vehicle is driven to a stop, the vehicle is already upright, such that the system only uses energy to close a hydraulic valve and hold the vehicle in the existing position (or applies very little pressure to adjust the lean angle a few degrees); this is analogous to the very limited energy a motorcycle rider uses when putting their toe on the ground at a stop to hold their vehicle in an upright posture.)

At very low speeds and on difficult terrain (such as steep driveways), the stand-up control system described herein dynamically keeps the vehicle upright adjusting to changing terrain. (Alternatively the system can also provide forced-leaning to lean the vehicle into a turn to match the so-called "G-forces" of such a turn. Those of skill in the art will appreciate that G-force as used herein refers to static and dynamic forces of gravitation and acceleration due to gravity or centrifugal forces such as those acting on a driver and his or her vehicle during straight-ahead, leaning, cornering, or accelerating operations.)

In the case of an emergency stop while leaning, the system has the power to stand the vehicle up from a full lean, allowing the driver to then resume driving.

The natural leaning vehicle described herein also has important advantages in ride smoothness and stability relative to forced-leaning vehicles. In forced-leaning vehicles, whether there are two wheels in the front of the vehicle, two in the rear, or two in both the front and rear, when a bump is encountered by a wheel on one side of the vehicle, the portion of the bump that is not absorbed by the suspension system is transferred into the body of the vehicle (because in forced-leaning, the angle of the body of the vehicle relative to the ground (and thus the wheels) is held in a firm setting). This means bumps are felt by passengers, and that the body of the vehicle has to be designed to constantly withstand such bumps, adding weight. It also means that the lean angle is disturbed, which can cause the vehicle to become unstable or even to tip over. In contrast, in the naturally leaning vehicle described herein, a bump encountered on one side of the vehicle is transferred to the wheel on the other side rather than into the body of the vehicle because the angle of the ground and wheels relative to the vehicle is free to change. Only a limited lift is transferred into the body of the vehicle. This free and natural leaning allows the vehicle to remain substantially in the preferred lean position for the current turn, speed, and terrain despite bumps and unevenness.

BRIEF DESCRIPTION OF THE DRAWINGS

FIG. 3A features the driver's seat folded forward; FIG. 3B features the driver's seat in its normal riding position; and FIG. 3C features the body's infrastructure in a cutaway view.

DETAILED DESCRIPTION OF THE PREFERRED EMBODIMENTS

Figure 1:
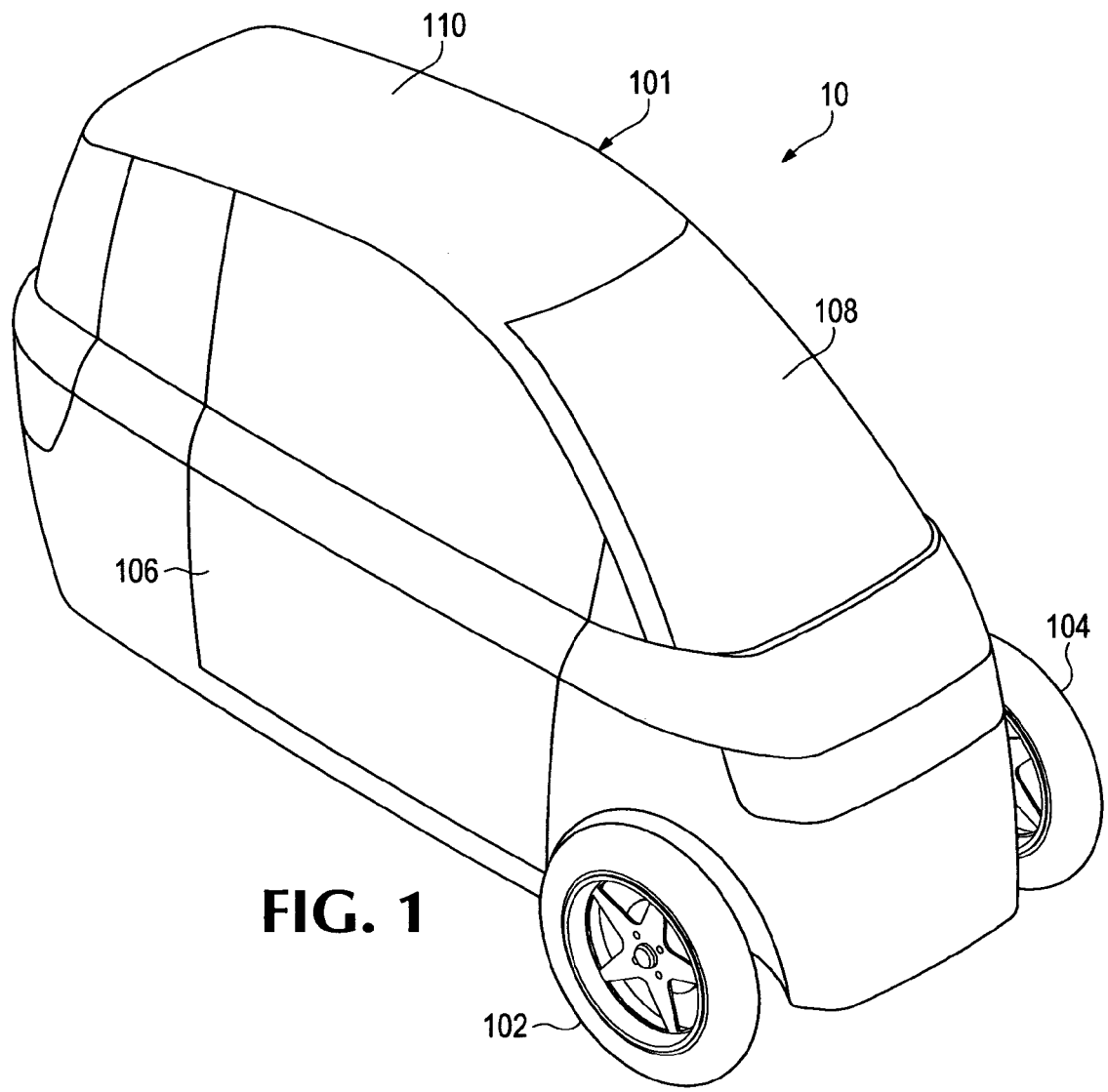
FIG. 1 is an isometric view of the vehicle in accordance with one embodiment of the invention, featuring the vehicle in a vertical standing orientation, showing the full enclosure of the vehicle, with the two front wheels visible, and the rear wheel not shown as it is obscured by the body of the vehicle.

FIG. 1 illustrates in isometric view a three-wheeled passenger vehicle 10 in a vertical orientation. The drive (and, in accordance with one embodiment of the invention, rear) wheel is obscured by the body of the vehicle. Two coast or idle (and, in accordance with one embodiment of the invention, front) wheels are also visible in FIG. 1. The technologies outlined here enable a vehicle with a group of benefits that were previously not possible. In short, the invention enables a new category of vehicle.

Most metropolitan drivers use over-sized vehicles that are capable of carrying 5 or more passengers even when they are driving alone. (In the U.S., 77% of workers commute alone in their cars.) These vehicles weigh an average of 4,000 pounds, with many weighing 8,000 pounds, and often achieve fuel efficiencies of less than twenty-five miles-per-gallon (MPG). They take up large swaths of road space (with traffic getting worse in forty-eight of the top fifty U.S. cities in a recent ten-year study), and are difficult and expensive to park in the increasingly limited space of most cities.

Addressing these challenges while providing a vehicle that meets drivers' requirements requires a new type of vehicle with a unique combination of attributes: 1) Light and ultra-efficient; 2) fully enclosed for safety, comfort, and quiet; 3) tall enough to be visible, comfortable and safe; 4) small and, narrow (a limited footprint) for easy maneuvering and parking; and 5) fun to drive, or users would not adopt its other benefits.

Having a small footprint with a height like that of other vehicles (for visibility and comfort), but with the weight of a full enclosure, would typically make a vehicle top-heavy or unstable. Other light vehicles use the strategy of being very low to the ground for stability, but this creates an unsafe, vulnerable feeling, especially compared to the height of SUVs and other vehicles.

The best and most unique alternative: the vehicle needs to lean.

The unique front end of the 3-wheeled design described here lets the driver lean the vehicle smoothly into turns for confident cornering and a natural motorcycle-style feeling. The vehicle's full enclosure, as depicted in FIG. 1 (or even a partial enclosure that would include doors and safety beams) means the user will not put his or her feet down at stops. Thus, the automatic stand-up control of this vehicle makes its enclosure possible—with the ability to automatically transition to a stable, upright position at stops and low speeds.

Those of skill in the art will appreciate the many advantages of a three-wheeled passenger vehicle relative to a two-wheeled motorcycle, including increased traction and increased stopping power with the two front wheels. In a typical motorcycle with one wheel in the front, a loss of front traction (in a turn or stopping) can easily cause the vehicle and rider to fall.

In addition to the unique free-to-lean platform, the vehicle uses a plug-in hybrid drive system that delivers efficiency, long range, and freeway cruising.

Driver and passenger are protected by a steel roll cage, 4-point safety harnesses, seat backs, and front airbags. The passenger sits behind the driver (tandem seating), allowing a balanced vehicle (like a motorcycle), reducing the vehicle's cross-sectional area, and thus also improving aerodynamics. Because the vehicle is enclosed, it can include climate control (heat, air conditioning), and a sound system, and a quiet cabin for safe hands-free telecommunications.

Another embodiment could include a limited enclosure and roll cage, or none at all. In those applications, the automatic stand-up control is still beneficial in relieving the user from putting his or her feet down and bearing the weight of a tilting vehicle at stops or when slowly traversing uneven terrain.

Because the vehicle is classified as a motorcycle in most jurisdictions, solo-drivers are permitted to use the high-occupancy vehicle (HOV) lanes (express lanes), saving time for drivers, and further relieving our cities' traffic problems.

These innovations, detailed further below, have led to a dramatically different vehicle platform with clear advantages in weight, efficiency, aerodynamics, driving experience, safety and stability.

Figure 2:
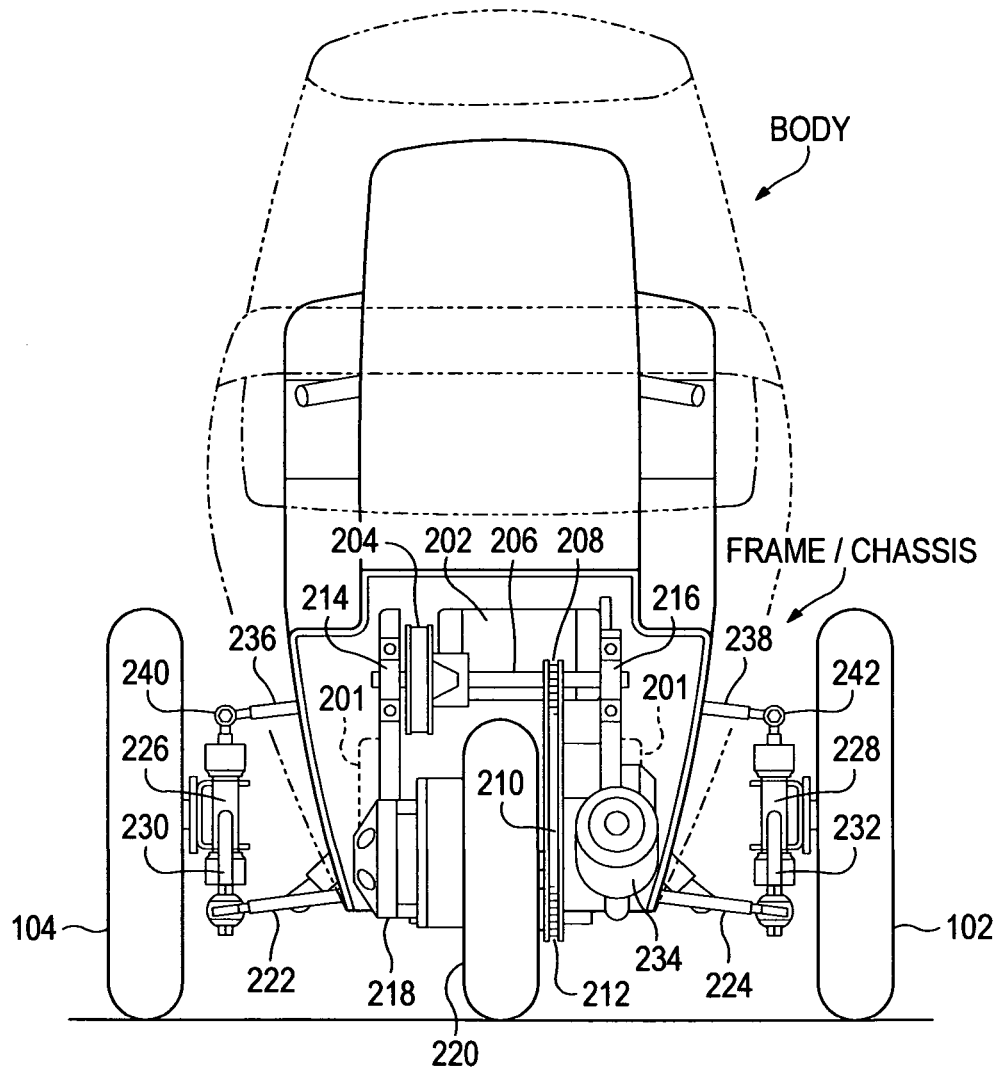
FIG. 2 is a rear elevation of the vehicle in a vertical standing orientation, with the body shown in dashed lines for clarity, featuring the vehicle's unique rear end hybrid drive and torque converter system.

FIG. 2 illustrates passenger vehicle 10 in a rear elevation as including a ground or street-confronting chassis or frame (FRAME/CHASSIS) and a passenger-enclosing body (BODY) mounted thereabove. Those of skill in the art will appreciate that the body is shown in dashed lines for the sake of clarity. The vehicle includes both an internal combustion (such as gas) drive system as well as an electric drive system. In one embodiment, the gas engine is mounted substantially under the front passenger, and provides power to the rear wheel via the continuously variable transmission 218. This system is commonly used on scooters from various manufacturers. The system can be economically adapted to also include an electric drive system as shown, with an electric motor 202 mounted to the same frame or swing-arm as that to which the gas engine is mounted or incorporated. This adaptation is further facilitated by using a transfer shaft 206 to deliver the electric motor's rotational power to the opposite side of the rear wheel 220, with a sprocket 208 mounted to the transfer shaft and another sprocket 212 mounted to the rear wheel. Further, power from the electric motor 202 can be delivered to the transfer shaft through a torque converter 204.

While an electric motor provides torque at a wide range of revolutions per minute (RPMs), this torque conversion provides a gearing effect which a) acts as a lower gear range and reduces the current drawn by the electric motor at low speeds, and b) acts as a high gear which reduces the speed at which the electric motor must rotate when the vehicle is operating at freeway speed under power from the gas engine. The torque converter can also be adjusted such that the electric motor is decoupled from the drive shaft. With such an adjustment, the electric motor does not have to turn when the vehicle is operating under power from the gas engine.

In another embodiment, no torque converter is used, with power from the electric motor transferred directly to the transfer shaft. This configuration reduces the friction losses of the torque converter, but does not provide the benefits a) and b) described above.

The configuration shown, with an electric drive and gas drive on opposite sides of the wheel, can also be used in an original design rather than an adaptation of an existing gas-powered vehicle. The configuration shown also provides a simple means for the power control system 1170 to separately and synergistically control the gas engine and electric motor, getting power from one, the other, or both, including the ability to use part of the gas engine's power to run the electric motor as a generator to recharge the batteries. The power control system is described in more detail below.

In another embodiment, the vehicle can be configured with other drive systems—such as an all-electric drive (more practical in the future when the cost of batteries is lower), a series hybrid (where the gas or diesel engine only provides charging for the batteries), a hydrogen fuel cell-based design, or others. But presently, the preferred embodiment, with the innovative hybrid design shown, best meets the needs of users for this application.

Of course several other companies have produced hybrid-powered vehicles—featuring sophisticated software tightly coupled with complex, highly-optimized mechanical systems. The innovation shown here is one of simplicity—what might be called a 'software-only hybrid.' That is, a mechanically simple system that relies mainly on control of the two power sources (the gas engine and the electric motor), adapting mainly off-the-shelf hardware, in a novel configuration that captures the bulk of the hybrid propulsion efficiency benefits.

FIG. 2 also provides a view of the left and right tie rods 222 and 224 which are not visible in other figures of the front suspension, discussed later. The outer ends of the tie rods are substantially in the same plane (a plane substantially parallel to that of the longitudinal center of the vehicle) as are the rotation points at the top and bottom of the uprights on each respective side of the vehicle (pivot points 240 and 412 on the left, and 242 and 408 on the right). This co-planarity keeps the ends of the tie rods substantially in alignment with the uprights as the vehicle leans to the left or the right, thereby minimizing any steering forced mechanically by the vehicle's leaning. This is one element of enabling a natural leaning (motorcycle-style leaning) feeling, where the driver naturally and instinctively manages leaning and steering as two independent variables which are balanced dependent on speed, desired direction, topography, and other factors. Further, this alignment minimizes bump-steer, the unintended steering input that can be caused when one wheel encounters a bump, raising that wheel, and potentially increasing or decreasing that wheel's distance from the center of the vehicle, which in turn, without this alignment, would cause the tie rod to force the wheel to steer. The inner ends of the tie rods are similarly placed as close together as possible, or mounted concentrically.

In another embodiment, these tie rod ends do not extend fully to the plane defined above, but rather extend to a point directly above a line that would extend between the contact patch of the respective front tire and the rear tire, thus creating so-called 'Ackerman' steering described below. The ideal length of the tie rods depends upon the application and represents a balance between the length required for co-planarity described above and the length desired for Ackerman steering.

FIG. 2 also shows the internal combustion engine 201, indicated in dashed lines for clarity as this component is substantially forward of most of the components featured in FIG. 2.

Figure 3A:
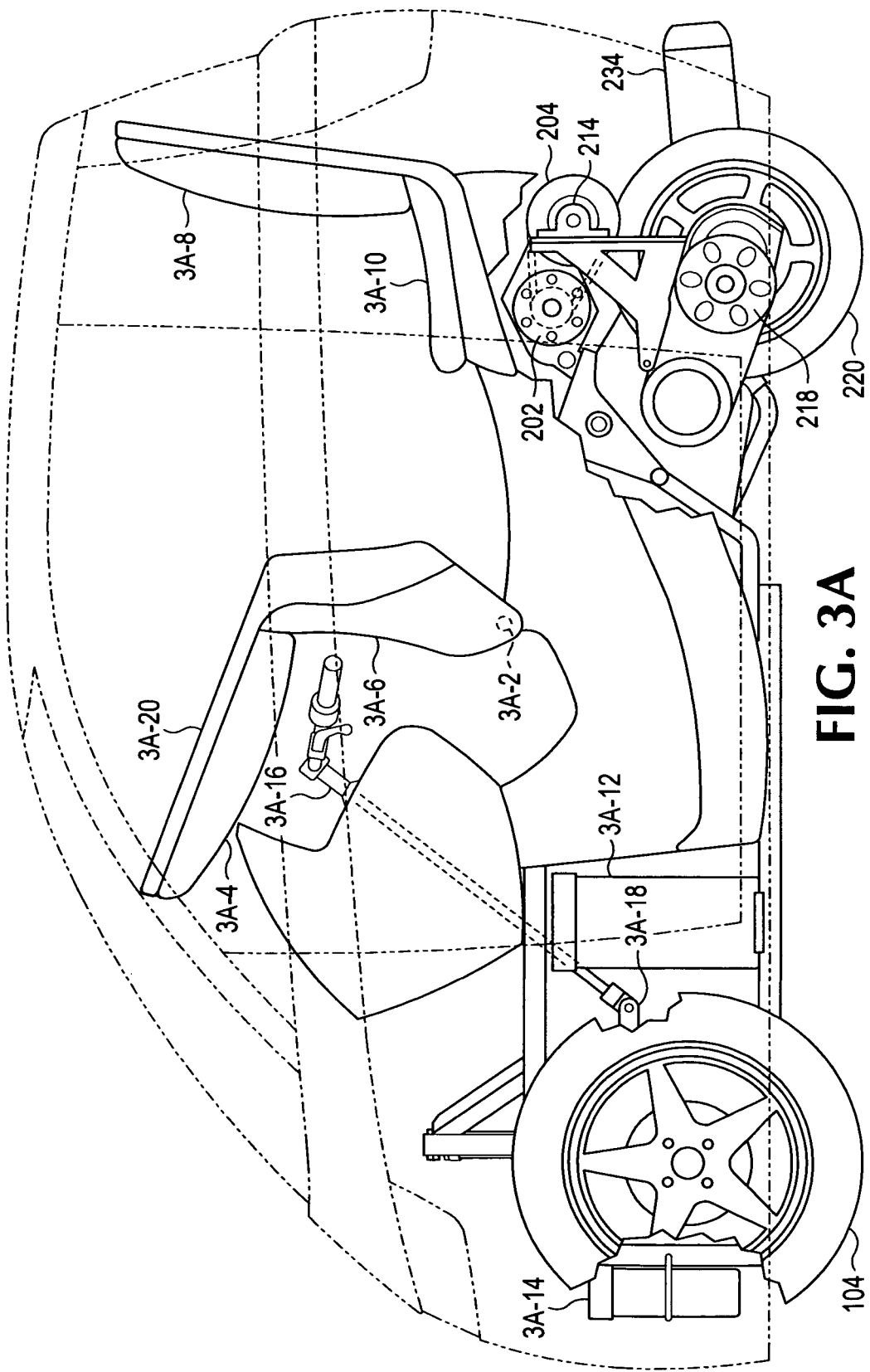
FIGS. 3A, 3B, and 3C respectively are a left, a right, and a right elevation of the vehicle in a vertical standing orientation, with the body shown in dashed lines for clarity, featuring the vehicle's unique body and seats for two passengers.
Figure 3B:
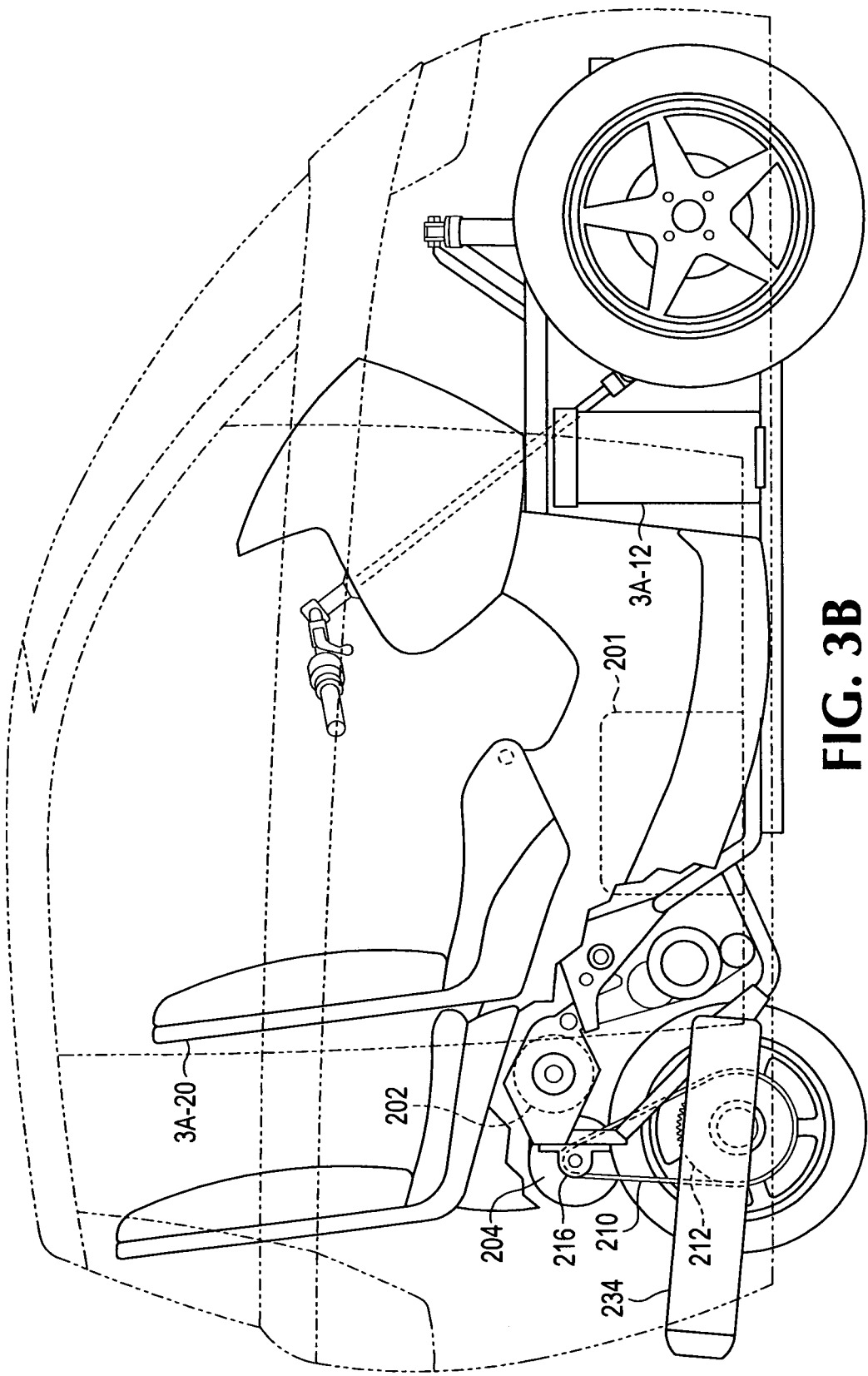
Figure 3C:
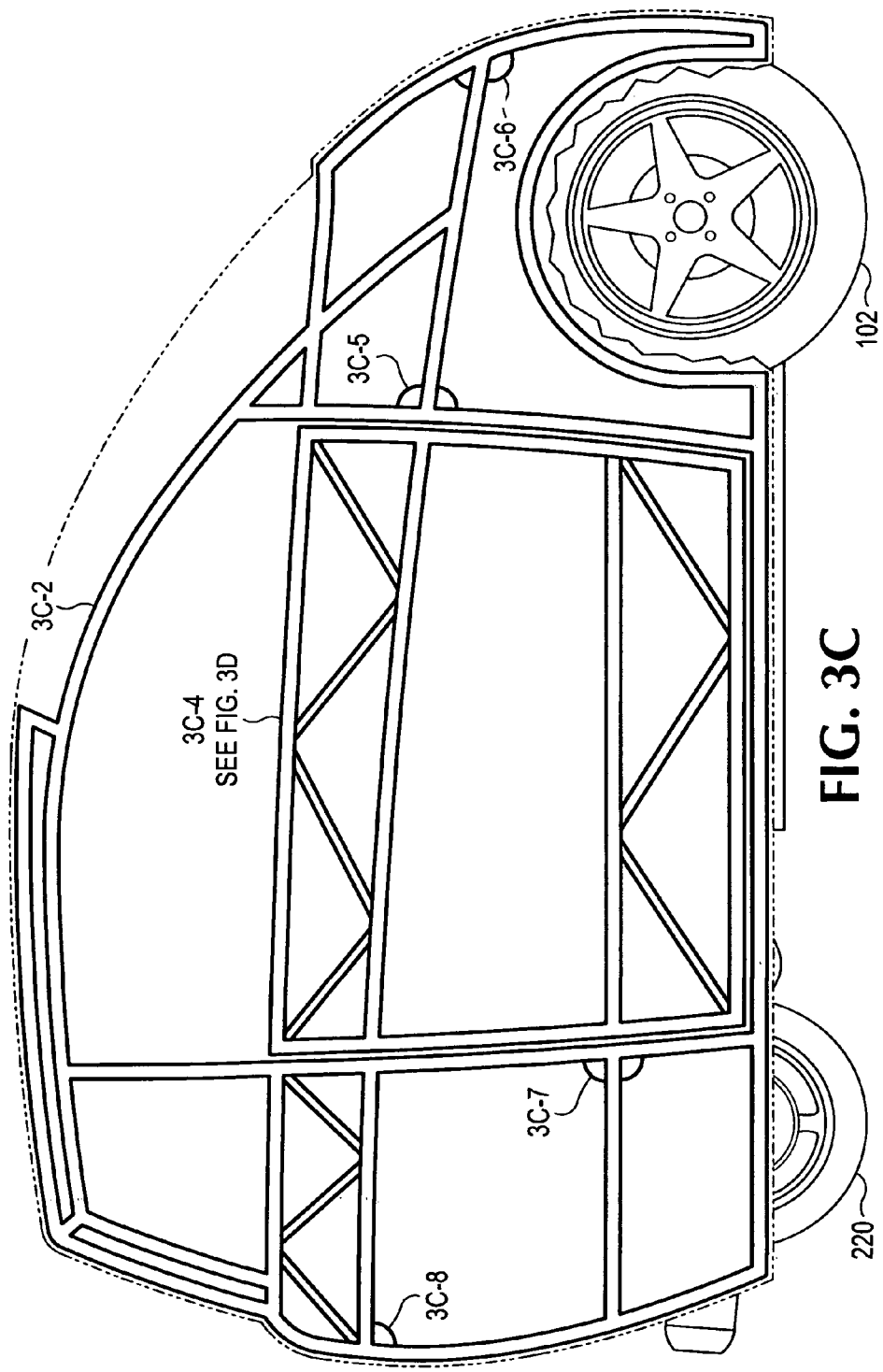

FIGS. 3A, 3B, and 3C illustrate the passenger vehicle 10 in a left, a right, and a right elevation, respectively. Those of skill in the art will appreciate that the body is shown in dashed lines for the sake of clarity in all three elevations. A rigid frame of safety cell bars 3C-2, similar to a roll cage, shown in FIG. 3C, is mounted to the vehicle's sub-frame or chassis at various points such as those shown in FIG. 3C (mounting points 3C-5, 3C-6, 3C-7 and 3C-8). This rigid frame supports and provides the structure for a complete enclosure 101 and safety cell to protect passengers in the event of a collision or roll-over. The safety cell bars also provide the rigid structure to which safety harnesses (for both the front and rear passengers) can be mounted.

FIG. 3A indicates placement of the battery pack components including the central battery pack 3A-12 and the front battery pack 3A-14 in one embodiment of the vehicle. The battery packs are placed toward to front of the vehicle to move weight forward.

FIG. 3A also shows the steering column 3A-16 extending down and forward from the handle bars toward the steering column u-joint 3A-18, where the joint transfers the user's steering input into the steering mechanisms (tie rods and steering arms) detailed later.

The system of safety cell bars can include safety beams (such as the right door safety beam 3C-4 shown in FIG. 3C, which include multiple tubes (including both substantially straight and substantially curved tubes) combined and including cross-members (trusses) to reinforce each other, adding strength while maintaining light weight.

Moreover, the substantially straight members of this beam system can be filled with a durable rigid lightweight filler material. See FIG. 3D. The substantially straight tubular member B includes a rigid filler material C which can be inserted as a rod into member B. This rigid filler material both adds its own strength to prevent bending, and resists the initial failure (bending) of the surrounding tubular member by preventing the tubular material from kinking inward. Using this filler material in the substantially straight members of the safety beam enables use of relatively inexpensive off-the-shelf rod materials for these fillers, such as carbon fiber rods, whose outer diameter approximately matches the inner diameter of the substantially straight tubular member, and that can be easily slid into the tubular member during the beam construction process. This substantially straight member B, with filler C, is then attached with welds W (or any alternative suitable attachment method) to braces BR in a truss structure to tubular members A and D, which can be either substantially straight or substantially curved, with each member thus supporting the strength of the others.

Figure 3D:
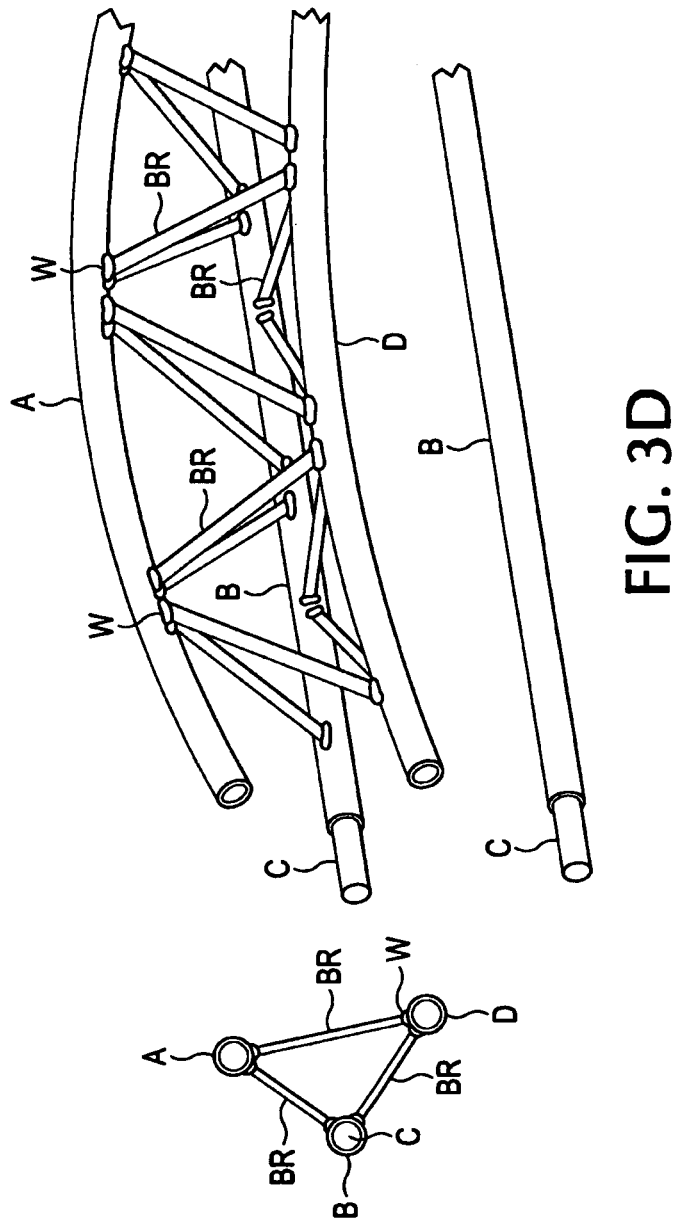
FIG. 3D is a fragmentary cut-away view that features a portion of the strong, lightweight, inexpensive safety beam designed for use in various portions of the vehicle's safety cell.

Those of skill in the art will appreciate from FIG. 3C and FIG. 3D that the invented beam system and the use of filler material within straight members thereof are believed to be useful outside the passenger vehicle field of use. For example, they can be used on other vehicles such as buses, military vehicles such as mine-resistant ambush protected vehicles (MRAPs), limousines, etc. They might also be used in aircraft, spacecraft, marine vessels, and underwater exploration vessels. They also might find utility in construction of homes, displays, enclosures, domes, stadiums, personal survival pods, sleeping quarters, pedestals, walls, ceilings, floors, observatories, and myriad other structural fields where high resilience to high impact and/or flexure are expected and wherein a durable and safe cellular structure is desired. Any and all such uses are contemplated as being within the spirit and scope of the invention.

The vehicle's full enclosure facilitates ingress and egress of two passengers. The rear passenger enters first, with the front seat frame 3A-20 tilted forward (as in FIG. 3A, using front seat hinge 3A-2), stepping into the vehicle and over the center of the vehicle, and then sliding rearward to occupy the back seat (including rear seat bottom 3A-10 and rear seat back 3A-8). The front seat frame 3A-20 is then tilted down (untilted, as in FIG. 3B) for use by the front passenger (driver), including front seat bottom 3A-6 and front seat back 3A-4). In another embodiment, the front seat back 3A-4 is mounted to its own frame separate from that of the front seat bottom, with said front seat back frame affixed to the roof or side of the vehicle, hinged to enable the front seat back to rotate forward or sideways to enable ingress and egress of the rear passenger.

Figure 4A:
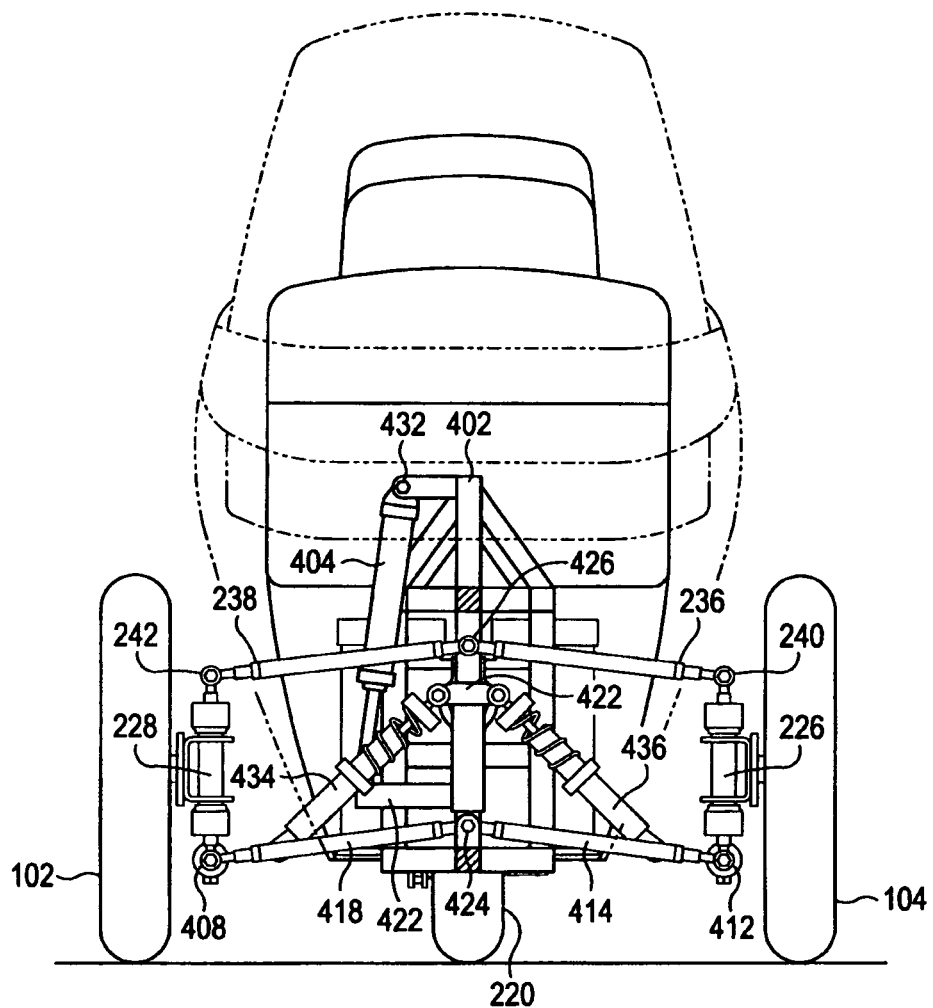
FIG. 4A is a front elevation of the vehicle in a vertical standing orientation, with the body shown in dashed lines for clarity, featuring the vehicle's unique front end suspension system.

FIG. 4A is a front elevation of a free-to-lean, three-wheeled passenger vehicle 10 in a nominally vertical orientation in accordance with one embodiment of the invention. Nominally vertical means vertical relative to the plane of the surface on which the vehicle is positioned or operated. Of course, if the vehicle is operated on a surface that is not horizontal, then the nominally vertical orientation of the vehicle is not true vertical. Those of skill will appreciate that the stand-up mechanism described and illustrated herein is configured to adjust a nominally vertical orientation of the vehicle to a true vertical orientation relative to gravitational forces incident thereon. Those of skill in the art also will appreciate that lean refers to an incline of the vehicle typically during a turn relative to its nominally vertical orientation when at rest.

Those of skill in the art will appreciate that the body has been removed for the sake of clarity in FIG. 4A. The suspension system shown herein makes a natural leaning yet fully-enclosed vehicle possible. In a typical natural leaning vehicle, such as a motorcycle, or other tilting three-wheeled vehicle, the driver would put his or her feet on the ground when stopping the vehicle, or would 'walk' with the vehicle when navigating uneven terrain (like a steeply-sloped driveway or parking garage) at very low speeds. But in a fully enclosed vehicle, one cannot put one's feet down on the ground to manually hold the vehicle upright, and even if one could put their feet down (such as through holes in the floor of the vehicle), the weight of the body (enclosure) of the vehicle makes it necessary to have mechanical assistance in holding the vehicle upright.

Some other three-wheeled leaning vehicles allow the driver to actuate a locking mechanism that rigidly fixes the lean position of the vehicle at stops, but then release the vehicle when sufficient forward motion begins; these locking systems lack the ability to dynamically hold the vehicle upright when navigating uneven terrain. If an enclosed vehicle were locked in a certain lean position, the weight of the body could easily cause the vehicle to tip over when navigating uneven terrain—especially if the position is locked when the ground surface slopes in one direction, and then the vehicle moves toward a surface sloped in the opposite direction.

The suspension system shown in FIG. 4A allows the vehicle to freely and smoothly lean in turns like a two-wheeled motorcycle but also automatically stands the vehicle upright at stops, and can dynamically hold the vehicle in an upright position at low speeds even when navigating uneven terrain. As an alternative to the free-leaning mode of operation (useful in certain situations, in training mode, and others), the control system can also determine the lean of the vehicle in turns if desired.

Figure 5:
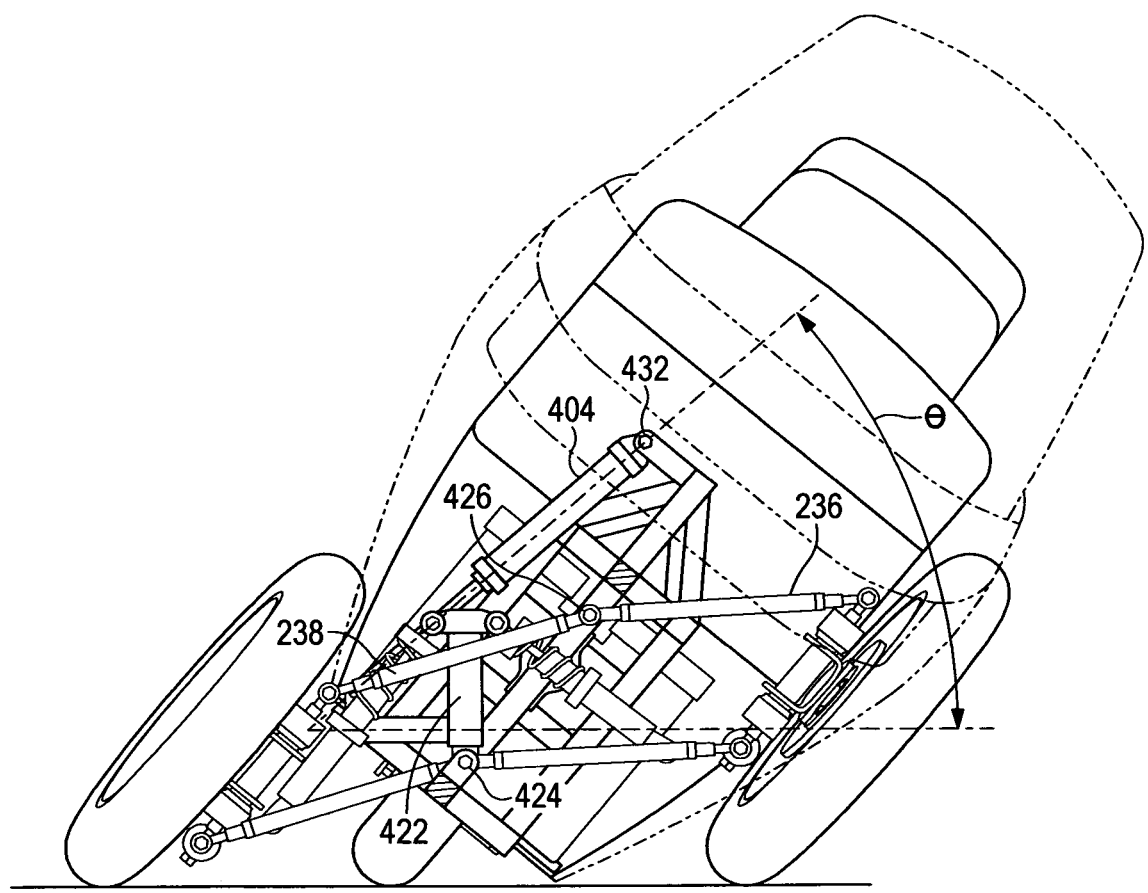
FIG. 5 is a front elevation of the vehicle in a left-ward leaning orientation, with the body shown in dashed lines for clarity.
Figure 6:
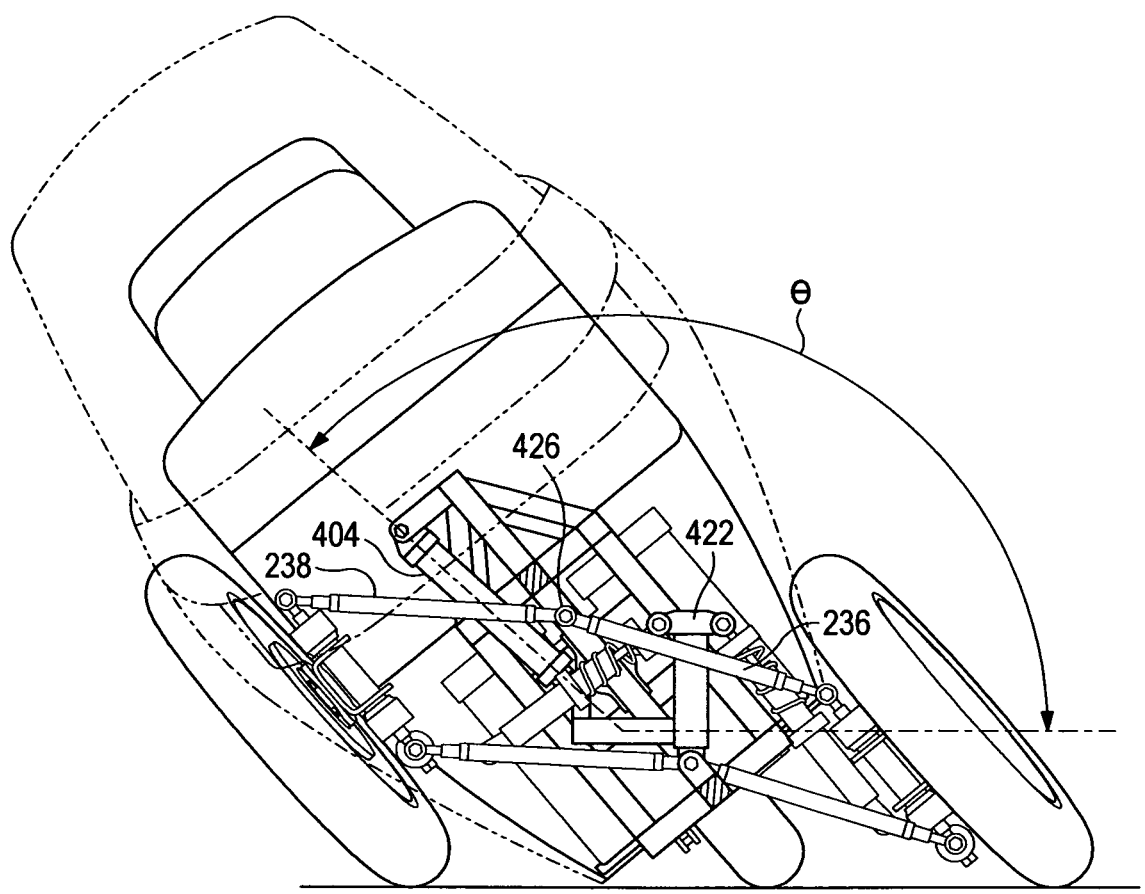
FIG. 6 is a front elevation of the vehicle in a right-ward leaning orientation, with the body shown in dashed lines for clarity.

As shown in FIG. 4A, the front wheels of the vehicle are mounted on right and left uprights 228 and 226. Each upright rotates about a substantially vertical axis, enabling the wheels to steer. Each upright is mounted on an upper and lower pivot (242 and 408 on the right of the vehicle; 240 and 412 on the left), with those pivots oriented substantially longitudinal with the vehicle (in the general direction of travel). These pivots are connected to structures extending outwardly from the vehicle, commonly known as articulating arms, or so-called 'A-arms', including an upper and lower A-arm on both the right 238, 418 and left 236, 414 of the vehicle. The inner ends of these A-arms are connected to central pivots, with both upper A-arms concentrically hinged about the central upper pivots 426, and both lower A-arms concentrically hinged about the central lower pivots 424. By concentric it is meant that the upper A-arms are pivotally mounted in a coplanar relationship with each other and with a central, longitudinal axis or plane subdividing the vehicle left and right. As shown in FIGS. 5 and 6, these pivots together enable the uprights and wheels to lean substantially in parallel with the vehicle.

A closer look at the upper A-arms 236 and 238 in FIGS. 5 and 6, specifically the inner ends of these A-arms, illustrates that they share a concentric point of rotation about the central upper pivots 426, in line along an axis that is substantially in line longitudinally with the direction of travel of the vehicle (on one shaft or on multiple shafts or rotation axis points that are in such alignment). The concentric nature of these points of rotation (along with the similar concentricity of the inner rotation points of the lower A-arms 414 and 418) has several advantages. First, it minimizes the change in the track width of the vehicle (the width between the contact patches of the two front wheels) as the vehicle leans to the left and right, which in turn reduces other challenges: resistance to leaning (which would compromise the free-to-lean feeling), friction on the front tires (which would cause inefficient rolling resistance and accelerated tire wear), stresses on the linkages, and compression that would compromise the layout of other components. If, instead, the inner rotation points for the right A-arms were moved toward the right of the vehicle, and the inner rotation points for the left A-arms were moved toward the left of the vehicle, then as the separation between these inner rotation points is increased, all of these track-width change problems would be exacerbated.

Second, one who is skilled in the art will see that this A-arm inner rotation concentricity maximizes the degree of lean the vehicle can achieve, which is essential for the natural leaning and constantly-balanced feeling of the vehicle in turns that require steep leaning. When the vehicle turns to the left as in FIG. 5, the angle between the upper right A-arm and the right upright becomes more obtuse. The same applies to the lower A-arm on the opposite side. As the lean increases, this angle grows. If the inner end of the A-arm were mounted to, and pivoting about, a point further out on the vehicle, this angle would increase more quickly. If this angle were to reach one hundred eighty degrees (180°), then the joint between these two components would be locked or could begin to hinge backward, making it impossible to stand the vehicle back up. Thus, the concentricity or co-location of the A-arms along a central longitudinal axis of the vehicle maximizes the degree of vehicle lean possible without undesirable lock-up occurring.

Suspension for the front wheels is provided by the right and left shock absorbers 434, 436, with their outer ends connected to the lower A-arms. Unlike a traditional vehicle, the upper inner ends of these shock absorbers are not connected to the vehicle's body or chassis; rather, they are connected to the suspension and hydraulic knuckle 422. Comparing FIG. 4A to FIGS. 5 and 6, those of skill in the art will see that the upright (nominally vertical) part of the suspension and hydraulic knuckle 422 remains in a substantially vertical position even when the vehicle leans. The lower part of the suspension and hydraulic knuckle is mounted to (and can rotate about) a central lower pivot, concentric with the central lower pivots 424 and with the inner ends of the lower A-arms. The suspension and hydraulic knuckle is shown in greater detail in FIG. 4B.

Figure 8:
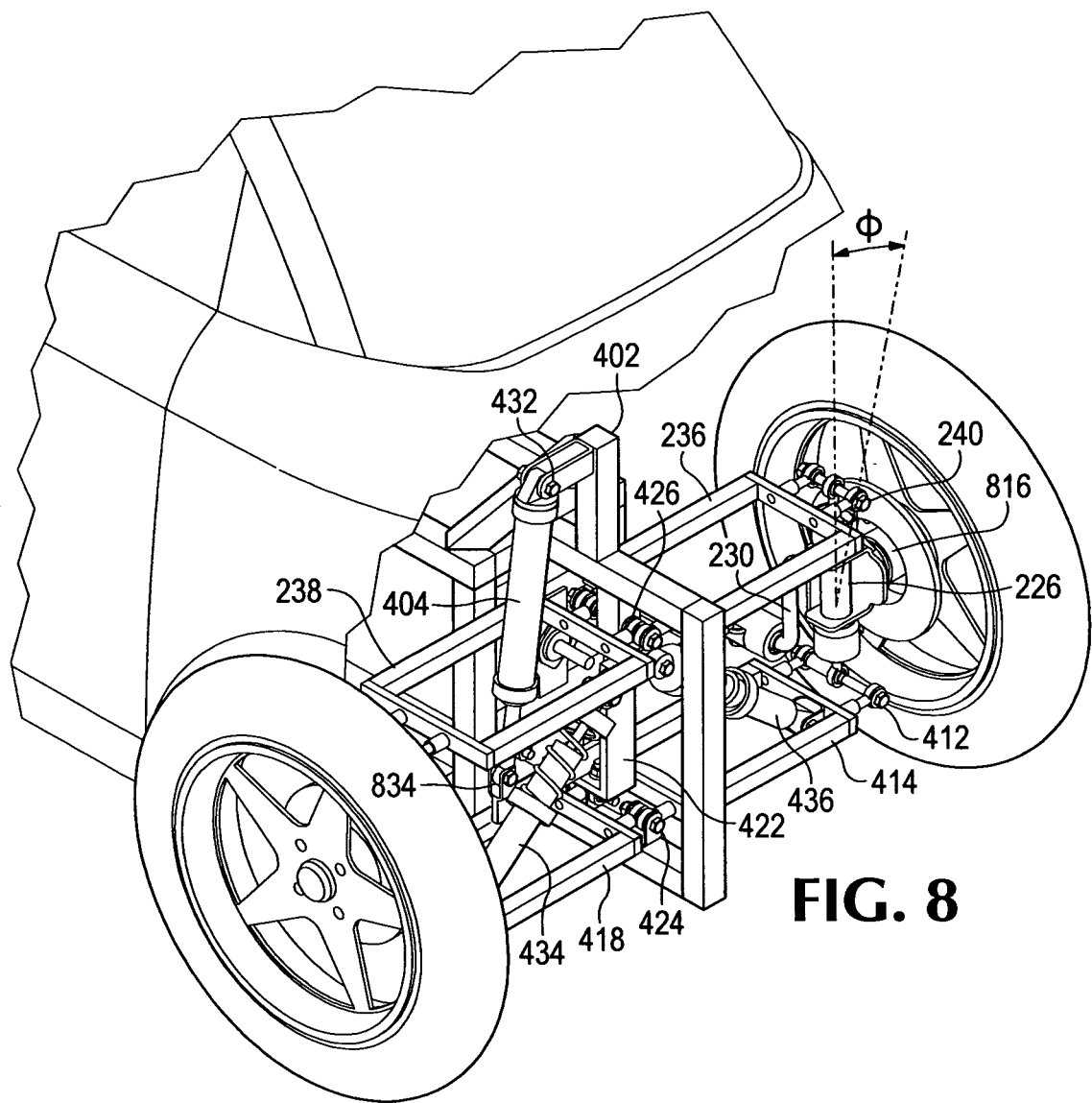
FIG. 8 is an isometric fragmentary view of the vehicle's front end.

The hydraulic and suspension knuckle 422 also includes the mounting point for the lower hydraulic pin 834 in FIG. 8, with the hydraulic cylinder 404 and piston extending upward from that point to the upper hydraulic pin 432. The upper hydraulic pin is mounted to the hydraulic tower 402 which is rigidly affixed to a left-to-right generally central region of the chassis of the vehicle. As show in FIGS. 5 and 6, the hydraulic cylinder's piston is extended when the vehicle leans to the left (FIG. 5), and is compressed when the vehicle leans to the right (FIG. 6). This extension and compression is caused by the leaning of the vehicle with nearly zero resistance from the hydraulic cylinder; this is enabled by the opening of the free-to-lean valve 1514 in FIG. 12. Those of skill in the art will appreciate that tower 402, knuckle 422, and hydraulic or pneumatic cylinder 404 extending pivotally therebetween for alternately controlled tension and compression to produce controlled pivoting between the relatively fixed-orientation knuckle and the relatively leanable tower are referred to herein collectively as a leaning mechanism. The hydraulic system is described in detail in later sections.

The configuration shown in FIG. 4A also allows Ackerman steering for the front wheels (by adjusting the length of the tie rods and the positions of the outer ends thereof), wherein the inside wheel is steered more into a turn than the outside wheel, both when the vehicle is held in an upright posture (such as at low speeds) and when the vehicle is leaning into turns, substantially matching the tighter arc followed by the inside wheel in a turn, and the larger arc followed by the outside wheel. This technique, common to two wheeled steering systems, improves both traction and efficiency by reducing friction in turns.

Figure 4B:
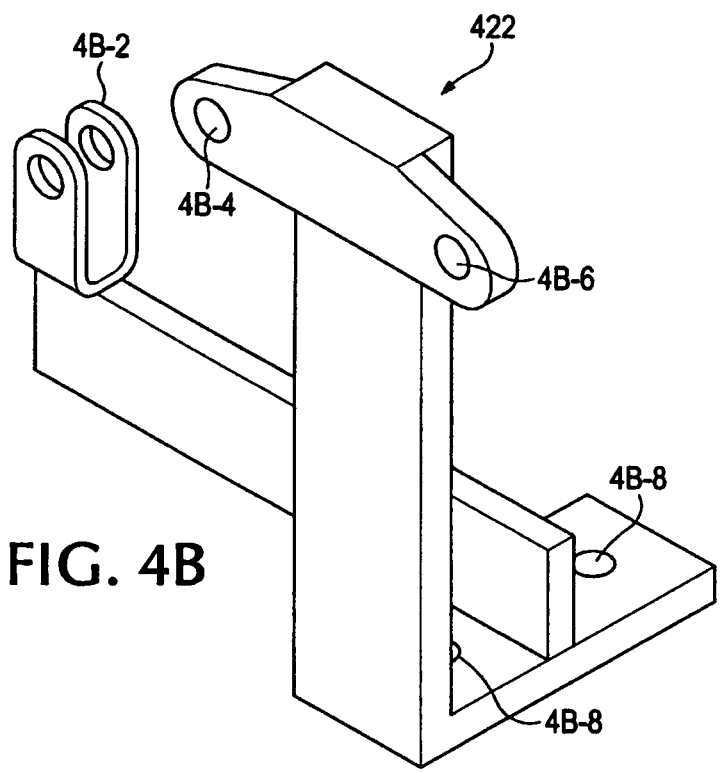
FIG. 4B is an isometric fragmentary detailed view of the suspension-and-hydraulic knuckle that is obscured in FIG. 4A and FIGS. 5-8 because it is centrally located in the suspension system.

FIG. 4B provides an isometric and fragmentary detailed view of the suspension and hydraulic knuckle 422 discussed above. This knuckle is core to the innovation, providing a simple, robust mechanical means of linking the upper ends of the shock absorbers 434 and 436 (which are rotatably affixed to the respective shock absorber mounts 4B-4 and 4B-6 in FIG. 4B) with the hydraulic system, which is rotatably connected to the lower hydraulic pin bracket 4B-2. Further, the knuckle is held downward (such that the shock absorbers cannot lift the knuckle) via the lower pivot mounts 4B-8, which are the mounting points for bearings or high-misalignment rod ends (so-called 'heim-joints'), with the rotatable end of these being connected to and rotatable about the central lower pivots 424, concentric with the central rotational mounting point for the lower A-arms 414 and 418. Thus, knuckle 422 will be understood centrally on the invented vehicle to mount what may be referred to herein as a front-wheel suspension subsystem as well as a pneumatic or hydraulic stand-up mechanism.

Those of skill in the art will appreciate that the hydraulic and suspension knuckle 422 shown is simplified for clarity of the drawings. The knuckle can be reinforced by the addition of a member directly connecting near the upper end of the vertical portion of the knuckle and near the outer end of the horizontal portion of the knuckle. Further, for manufacturing purposes, this unique, compact, robust part can be cast in one piece. Such a casting alternatively can include ears or brackets for bushings or bearings that rotate about the central lower pivot 424, rather than the mounting holes currently shown as lower pivot mounts 4B-8.

FIG. 5, mentioned above, illustrates the vehicle 10 of FIG. 4 in a front elevation featuring a left-leaning orientation of approximately 40°. Those of skill in the art will appreciate that the body has been removed for the sake of clarity.

FIG. 6, mentioned above, illustrates the vehicle 10 of FIG. 5 in a right-leaning orientation of approximately 40°. Those of skill in the art will appreciate that the body has been removed for the sake of clarity.

FIGS. 5 and 6 also highlight the position of the hydraulic cylinder 404 in the preferred embodiment. The hydraulic cylinder 404 and its piston form an angle θ relative to the substantially horizontal portion of the suspension and hydraulic knuckle 422 as shown in FIGS. 5 and 6. Relative to a perpendicular relationship, this angle ranges between plus and minus approximately fifty degrees)(±~50° as the vehicle leans from a full right lean shown in FIG. 6 at approximately 140°, to a full left lean show in FIG. 5 at approximately 40°. This positioning ensures that the hydraulic cylinder 404 always has a relatively strong attack angle relative to the substantially horizontal portion of the suspension and hydraulic knuckle 422, enabling the hydraulic system to lift and position the vehicle while keeping the size and weight of the hydraulic system and the various connected linkages and mounting systems relatively small and light. If the hydraulic cylinder's attack angle θ were much more acute in a left lean (FIG. 5) or much more obtuse in a right lean (FIG. 6), then a larger vector component of the hydraulic force would be in-line with the substantially horizontal portion of the suspension and hydraulic knuckle 422, pulling or pushing against the length of said member, with such force providing no benefit in positioning the vehicle.

Figure 7:
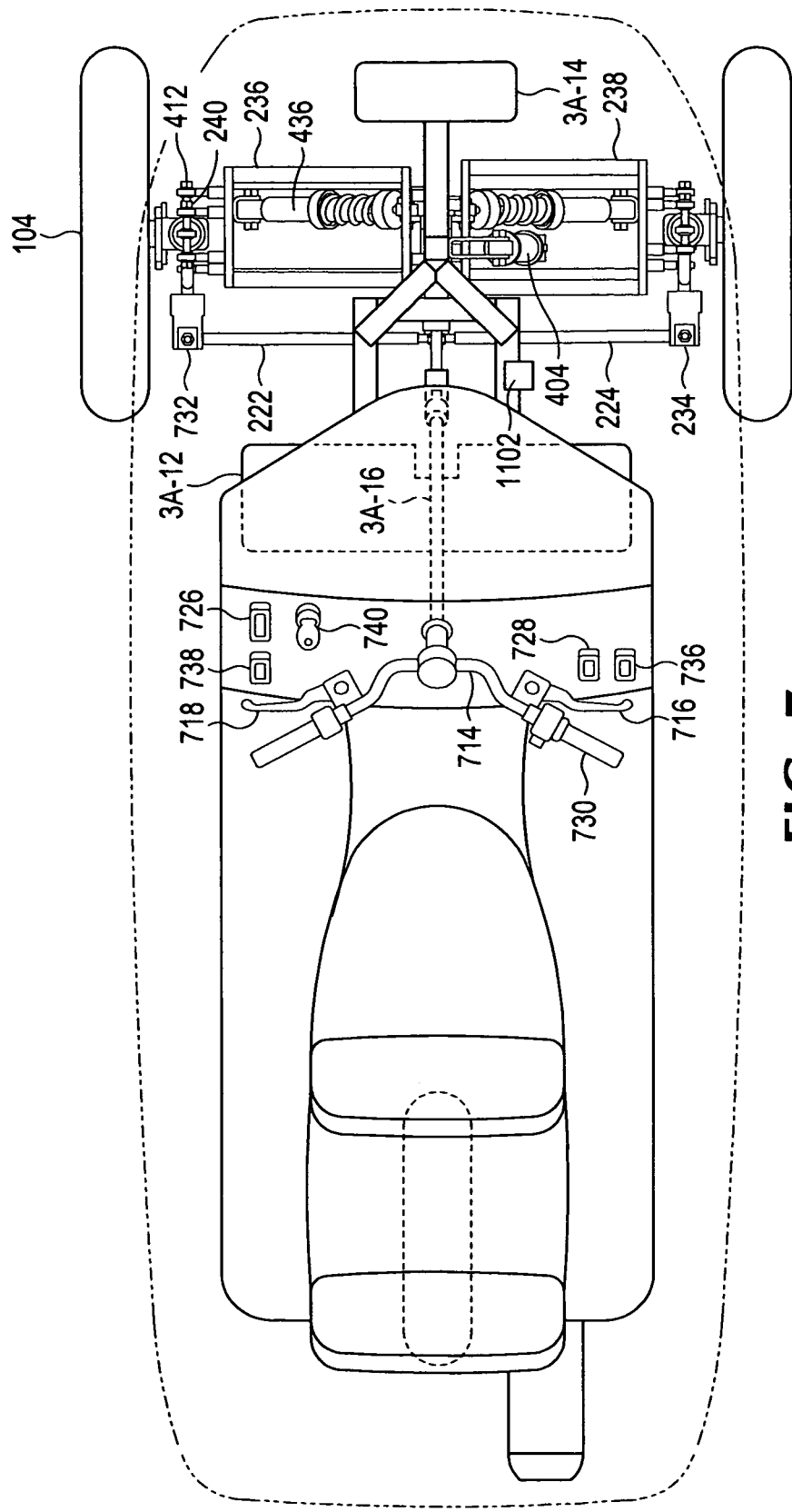
FIG. 7 is a top plan view of the vehicle in a vertical standing orientation, with its body shown in dashed lines for clarity, featuring the vehicle's handle bars, throttle grip and brake levers (like those of a motorcycle) along with the vehicle's unique additional controls such as the mode switch, stand-up override switch, and other console features, as well as an additional view of the front-end suspension and steering linkages.

FIG. 7 illustrates the vehicle 10 in a top plan view corresponding with FIG. 5. Those of skill in the art will appreciate that the body has been removed for the sake of clarity. A key advantage of the vehicle's leaning ability is that it can have a small footprint, valuable for maneuverability and parking in dense urban environments, and occupying less space on roads. Leaning shifts the vehicle's center of gravity inward when turning, preventing the vehicle from feeling unstable or tipping over. Without this leaning ability, the vehicle would need to be much wider (like the Aptera design, which is wider than most sport utility vehicles (SUVs) and light-duty trucks) and therefore less maneuverable and harder to park, or the vehicle would have to be very low to the ground like a small sports car (which can make occupants feel very vulnerable to injury if their vehicle were to collide with a typical-height car or truck). As shown in FIG. 7, one embodiment of the vehicle has the total width (from the outside of the left front wheel to the outside of the right front wheel) of not more than four feet, and a total length of under nine feet, with the maneuverability and parking advantages described above, including the ability to park in spots designated for motorcycles.

FIG. 7 also depicts the relationship of the front wheels and the rear wheel of the preferred embodiment, where the contact patches (point of contact with the ground) of the three wheels forms an isosceles triangle with the base of said triangle formed by a line between the contact patches of the two front wheels.

FIG. 7 also features the left and right steering arm joints 732 and 734. These joints have the ability to both hinge in a plane substantially parallel to the ground (for vehicle steering), and to rotate about the end of the steering arm, with this rotation required as the vehicle leans.

(FIG. 7 also shows the position of gyro 1102 in accordance with one embodiment of the invention. Those of skill in the art will appreciate that gyro 1102 as well as other depicted features within the spirit and scope of the invention can be positioned and oriented in any suitably functional and/or beneficial manner.)

FIG. 7 further illustrates the layout of controls for the driver. The vehicle uses handlebars 714 like those on a typical motorcycle, facilitating familiarity for anyone who has ridden a motorcycle or bicycle before, and enabling quick training for those who have not. The handlebars immediately convey to the driver that this vehicle drives differently from a typical car with a steering wheel. Rather than a steering wheel, the use of handlebars triggers in the driver the need to 'balance' the vehicle once it is at speed, and facilitates counter-steering (pressing on the inside handlebar grip) to initiate leaning into turns.

Various other driver controls are also illustrated in FIG. 7: The mode switch 726 allows the driver to select electric-only, hybrid, and sport modes, with this selection being used by the power control system 1170 to use the electric motor and gas engine power systems accordingly. The forward/reverse switch 738 allows the driver to put the vehicle in 'reverse' using the electric motor. The power control system also limits the vehicle's speed when in reverse. The driver expertise switch 728 allows the driver to indicate a level of experience in driving the vehicle (beginner, intermediate, and expert), which the stand-up control system 1150 uses to define how quickly the stand-up system will prevent further leaning at a given speed. These driver expertise selections enable the system to prevent a beginner from leaning too much in a slow turn, while at the same time allowing an expert driver to allow the vehicle to 'fall into a turn' steeply before dramatically accelerating out of such a leaning turn. Finally, the stand-up override switch 736 allows a driver to indicate that the stand-up control should remain active above the normal speed at which the vehicle would be free to lean. This is helpful on uneven terrain such as a steep and curving driveway, where the stand-up control will dynamically hold the vehicle upright and at speeds above which the stand-up control system would typically let the vehicle lean freely. When this stand-up override is engaged, the vehicle's speed is limited by the power control system such that while the vehicle is being held upright, an abrupt turn cannot cause the vehicle to tip.

FIG. 8 is an isometric fragmentary view of the vehicle's front end. This view provides access to the lower hydraulic pin 834, showing where the hydraulic cylinder and piston connect to the hydraulic and suspension knuckle 422. With this view, those of skill in the art will see that as the hydraulic cylinder is extended, it presses downward on the lower hydraulic pin, which is mounted through the lower hydraulic pin bracket 4A-2 of the suspension and hydraulic knuckle detailed in FIG. 4A. Since the vertical portion of the suspension and hydraulic knuckle is held substantially in a vertical position by the shock absorbers (which are connected to the left and right shock absorber mounts in FIG. 4-A), such an extension of the hydraulic cylinder would thus lean the vehicle to the left, and a contraction would lean the vehicle to the right. Similarly, when the hydraulic valves are open and the hydraulic cylinder is free to extend and contract in reaction to the leaning motion of the body of the vehicle, then the connection provided by the lower hydraulic pin 834 means that a leftward leaning of the vehicle causes the hydraulic cylinder to extend, and a rightward leaning of the vehicle causes the hydraulic cylinder to compress.

FIG. 8 also shows the hydraulic tower 402 which includes a substantially vertical portion that is rigidly affixed to the vehicle chassis, reinforced by members extending upwardly from the vehicle chassis to this substantially vertical portion of the tower. The tower also includes a substantially horizontal arm to which the hydraulic cylinder 404 is mounted via the upper hydraulic pin 432. Those of skill in the art will appreciate that hydraulic tower 402 may be referred to herein as including suspension knuckle 422, because the two are both centrally located left-to-right of the vehicle's centerline and are rigidly FIG. 8 also shows that the left upright 226 is mounted such that the upper part of the upright is further rearward than the lower part of the upright, creating what is called 'caster' by those skilled in the art. This gives the front wheels a natural tendency to steer toward a straight forward position. Specifically a vertical line through the center of the upright forms an angle Φ relative to a vertical lateral plane through the centers of the front wheels. The right upright is set parallel to the left upright, forming the same angle Φ relative to a vertical lateral plane through the centers of the front wheels. This angle can be adjusted for different vehicle applications, and in the preferred embodiment this angle is set to between approximately three and eight degrees (between ~3° and ~8°). Slight increases in this angle cause the vehicle to tilt more aggressively into turns when counter-steering.

Figure 9:
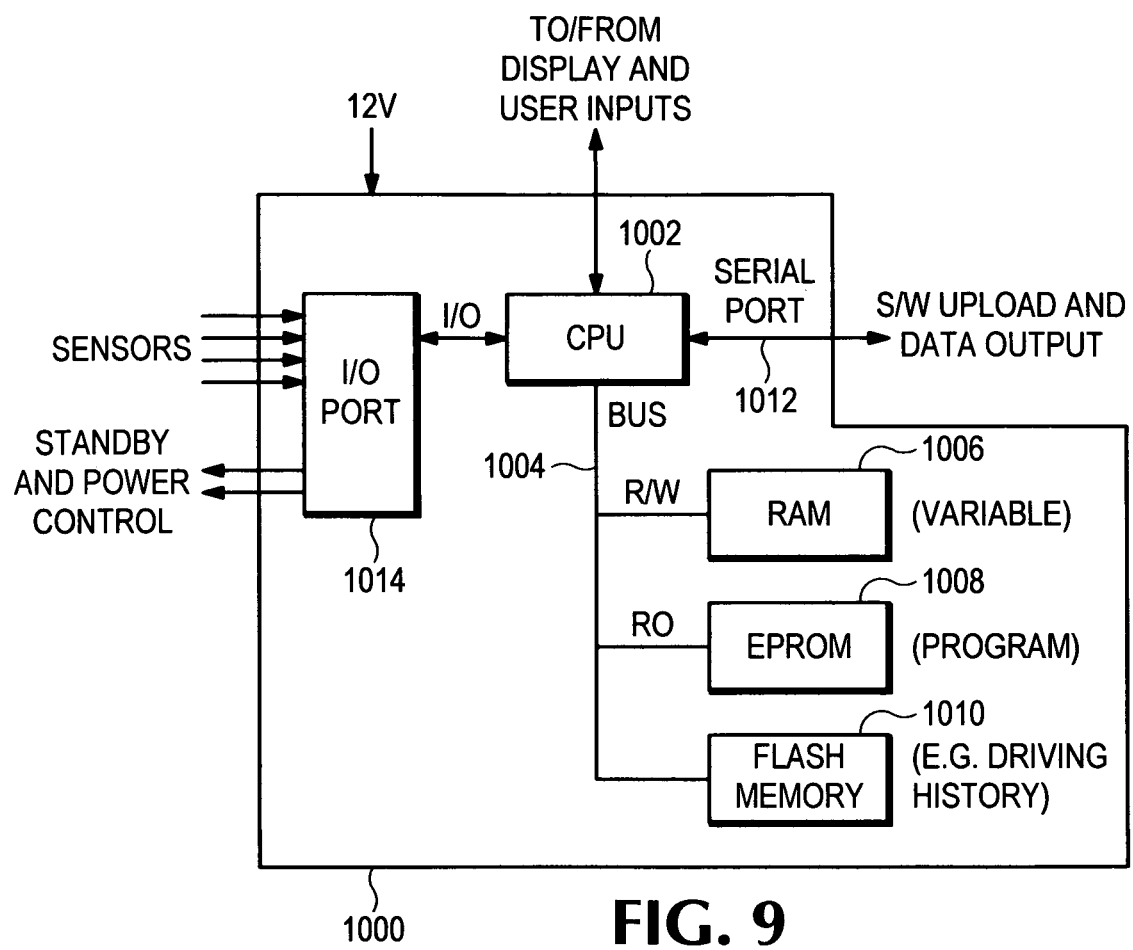
FIG. 9 is a simplified schematic diagram illustrating the hardware/firmware/software embodiment of the invented three-wheeled vehicle's 'smart' stand-up control and power control features.

FIG. 9 is a simplified schematic diagram illustrating the hardware/firmware/software embodiment of both the invented three-wheeled vehicle's 'smart' stand-up control system and its power control system. A controller or microcontroller 1000 can be containerized and mounted in any suitable location within the invented passenger vehicle, as is conventional for modern vehicles of other types. Microcontroller 1000 in accordance with one embodiment of the invention includes a processor or microprocessor (or central processing unit (CPU)) 1002 and a data bus 1004 including read/write (R/W) lines and read-only (RO) lines that connects the microprocessor with one or more of a read-and-write or random-access memory (RAM) 1006, an erasable-programmable read-only memory (EPROM) 1008, and a flash memory 1010. These last three elements will be referred to herein simply as memory, and it will be understood that the memory can within the spirit and scope of the invention take different forms or can be differently partitioned to provide for the temporary or permanent or semi-permanent storage of instructions and/or data in any suitable form. Microcontroller also includes a serial port 1012 (e.g. a universal serial bus (USB)) for software uploading and data or status output. Finally, microcontroller 1000 includes a parallel input/output (I/O) port 1014 for input and/or output from various SENSORS and/or STANDBY AND POWER CONTROL or other signals. CPU 1002 provides also for inputs from a user such as a driver of the vehicle and/or outputs to displays, etc. Those of skill in the art will appreciate that microcontroller 1000 can be operated conventionally from a direct current (DC) power source such as a twelve volt (12V) battery.

Those of skill in the art also will appreciate that a microcontroller is programmed to execute software instructions stored at least temporarily in a memory and executed in a microprocessor. The provision in the stand-up control and power control systems described and illustrated herein of one or more Universal Serial Bus (USB) ports provides for pre-production software/firmware development and/or post-production software revisions and/or upgrades. The USB port enables a laptop computer, for example, to be connected to the microcontroller and to over-write and/or otherwise modify instructions and/or data stored in the microcontroller's memory. Such will be understood to enable straight-forward and so-called 'on-the-fly' functional and behavioral changes to be made any time they are needed, as well as to add functionality as smarter control algorithms are developed.

Those of skill in the art will also appreciate that the microcontroller and associated software implementation can utilize any suitable operating systems (OSs) such as a real-time operating system (RTOS), control programming languages, software toolkits, etc.

The hydraulic system also provides the unique ability to dampen oscillation that can occur between the two front wheels. This is important for a free-leaning vehicle that can operate in a wide range of conditions—including variations in tire pressure (which changes with ambient temperature and duty cycle (duration of road friction) as well as maintenance), mechanical friction in the various suspension system pivots and other joints (which can change with maintenance and wear), shock absorber and spring conditions, road conditions and surface types, vehicle weight (including passengers, cargo, fuel, accessories), speed and wind. In truly free-leaning designs (with minimized friction that would otherwise resist leaning), an upward bump encountered by one front wheel causes compression in that shock absorber and spring, with that load simultaneously transferred to the opposite shock, spring and the opposite wheel. The load is not transferred to the body or chassis of the vehicle. One skilled in the art will understand that this configuration also means that a bump can then 'bounce' back to the wheel that initially encountered the bump. Depending on the speed of the vehicle and all of the other conditions noted above, a resonance frequency is determined that can cause such a bump (or simply road vibration) to cause an oscillation between the front wheels that can continue and even grow in amplitude.

Figure 10:
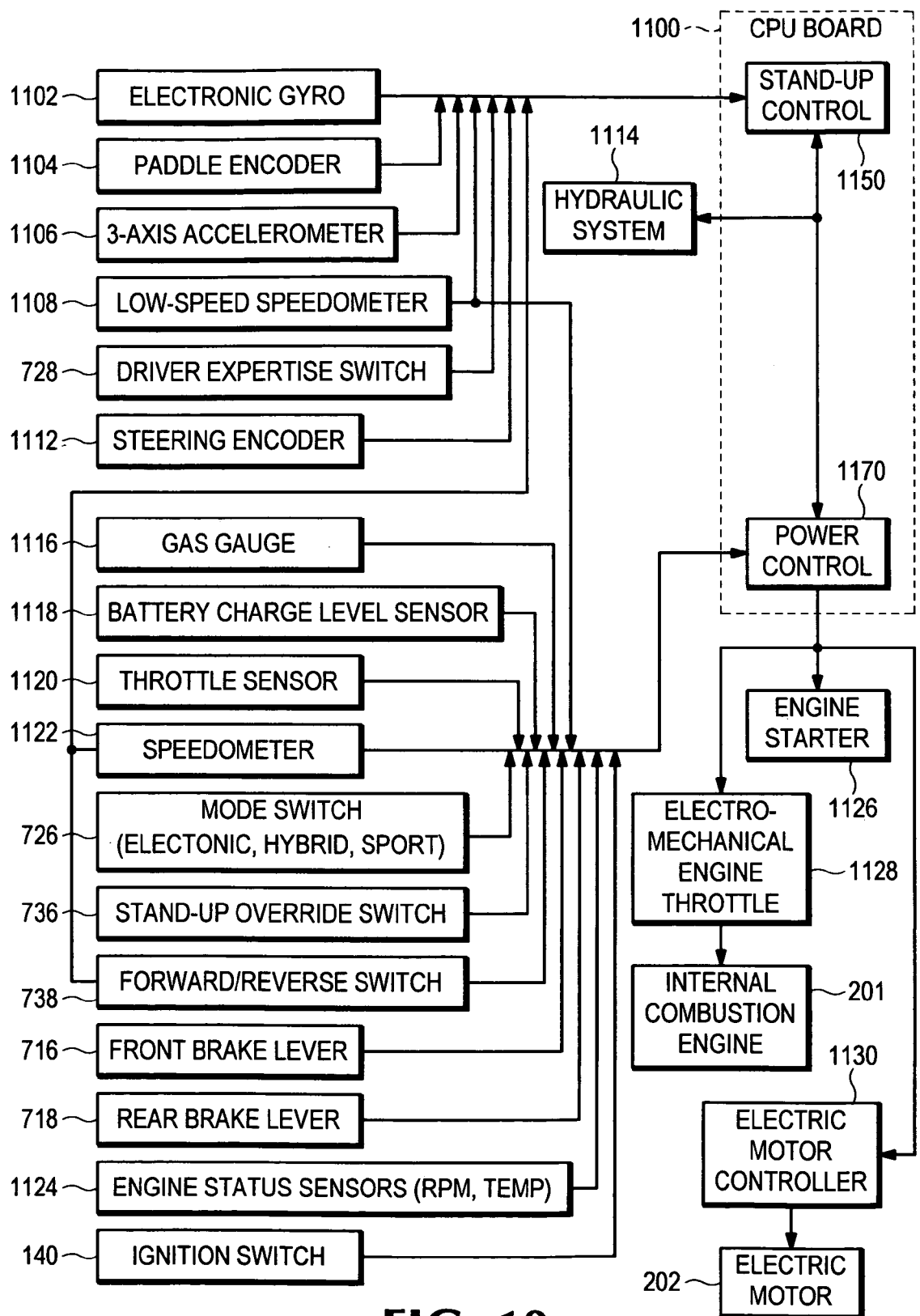
FIG. 10 is a more detailed schematic diagram of the 'smart' controller that controls the operation of the vehicle, featuring its smart computer-assisted multi-mode hybrid power plant control, and its auto-stand-up control, including its suspension oscillation dampening capability.

FIG. 10 is a schematic block diagram of a controller that controls the operation of the vehicle 10, in accordance with one embodiment of the invention. Controller 1100 in accordance with embodiment of the invention includes a stand-up control mechanism 1150 and a power control mechanism 1170. Stand-up control mechanism 1150 is operatively coupled with an electronic gyro 1102; a paddle encoder 1104; a 3-axis accelerometer 1106; a low-speed speedometer 1108; a driver expertise switch 1110 and 728; and a steering encoder 1112. Stand-up control mechanism 1150 controls a hydraulic system 1114 and power control mechanism 1170, as shown, with the control paths therebetween generally being shown as bidirectional (double-ended arrows) to represent data, whether stimulus/control or response/status, typically flowing both ways. Those of skill in the art will appreciate that stand-up control mechanism 1150 and power control mechanism 1170, in accordance with one embodiment of the invention are implemented in a combination of hardware, firmware and software on what is shown in dashed outline as a central processing unit (CPU) board. Alternative configurations are contemplated as being within the spirit and scope of the invention.

Stand-up control mechanism 1150 will be understood by those of skill in the art to provide for the automatic control of hydraulic system 1114 and power control mechanism 1170, based upon a number of vehicle condition input sensors, and, in turn, to control the vehicle's hydraulic system including the cylinder. Such sensory inputs such as vehicle speed, direction, orientation, handlebar angle, acceleration, etc. thus are monitored to determine how the stand-up control should be angled for optimal vehicular performance.

The hydraulic system and stand-up control of this design has the unique ability to manage and dampen the potential oscillation described previously. An oscillation causes the hydraulic and suspension knuckle 422 to move left and right relative to the chassis. The paddle encoder 1104 in FIG. 10 senses this movement with a signal sent to the stand-up control 1150. When the stand-up control identifies that oscillation is occurring at a regular frequency (distinct from movement that would be caused by a random series of bumps), the stand-up control constricts the flow of hydraulic fluid through the free-to-lean valve 1514, temporarily transferring a portion of the force of the wheels' oscillation into the chassis and body of the vehicle. This flow constriction can be performed at a frequency according to that of the oscillation, dampening the oscillation while still allowing leaning the vehicle (which occurs at a much lower frequency). Further, this dampening can be done by either completely closing the free-to-lean valve at a certain frequency, or partially closing the valve at a certain frequency, causing enough resistance to dampen the oscillation. As the vehicle's speed, road surface, or other conditions change, the resonant frequency of the oscillation is no longer encountered and the dampening is not necessary.

Referring still to FIG. 10, power control mechanism 1170 is operatively coupled to a gas gauge 1116; a battery charge level sensor 1118; a throttle sensor 1120; a speedometer 1122; a mode switch (electric/hybrid/sport) 726; stand-up override switch 736; a forward/reverse switch 738; ignition switch 740; a front brake lever 716; a rear brake lever 718; and engine status sensors (RPM, temperature) 1124. Power control mechanism 1170 controls the engine starter 1126; electro-mechanical engine throttle 1128 (and, in turn, controls the power supplied from the internal combustion engine 1172 and 201); electric motor controller 1130 (and, in turn, controls the power supplied from the electric motor 202). It may be seen that speedometer 1122 and forward/reverse switch 738 also provide inputs to stand-up control mechanism 1150.

Thus, power control mechanism 1170 will be understood by those of skill in the art to provide various output controls including starter and hybrid power plant control based upon a number of vehicle condition input sensors monitored to determine how the vehicle's power plant and starter should be operated for optimal vehicular performance. This is discussed in some more detail below.

Those of skill in the art will appreciate that vehicle operating conditions such as hybrid or other, date/day-of-the-week (e.g. based upon a stored calendar), time of day (TOD), global position; driver routes and routines, can also be considered, e.g. if it is Monday morning, then the driver probably is going to work; estimated time of arrival (ETA) and speed/fuel conservation trade-off; and driver/vehicle behaviors such as start-stop, speed, and acceleration; etc. may be stored in a memory as it is sensed or otherwise determined or derived (monitored), and logged either continuously or periodically. Such information can then be made available to the microcontroller software, which can make intelligent 'decisions' about the semi-automatic operation of the passenger vehicle. For example, a global positioning system (GPS) may determine that the driver's probable destination is just around the next corner so that it can 'anticipate' a leaning stop due to a road grade that the microcontroller has noted before due to the stored information it collects while the vehicle is driven. Or a route and calendar routine might be recognized that indicates the driver is commuting to work along the interstate, that the driver typically (historically) uses the hybrid operational mode for this trip to save gas, and can automatically set up operation of the vehicle for this particular trip for another hybrid cruise. Those of skill in the art will appreciate that empirically derived and stored historical vehicle and/or driver data (such as travel route or routine) thus can be used to enhance the efficiency, ecology, and enjoyment of the driver of the invented passenger vehicle.

The preferred embodiment of the vehicle includes the lightest, most energy dense and power dense batteries that are economically available and sufficiently robust for vehicle applications. Presently, these criteria favor lithium iron phosphate batteries or other lithium-based chemistries. Keeping the batteries lightweight is an important consideration in the overall weight (and thus efficiency) of the vehicle. Further, the energy density contributes to maximizing the vehicle's electric-only range and hybrid capabilities. In addition, the power density is important to provide rapid electric-powered (or electric-assisted) acceleration and to immediately absorb as much of the energy provided by regenerative braking as possible.

Those of skill in the art will appreciate that the invented vehicle controller provides unprecedented operational versatility and optimization. The controller is programmed in accordance with one embodiment of the invention to sense one or more operating, environmental, or historic parameters including vehicle position, orientation, throttle position, battery charge condition, speed, fuel supply, and acceleration as well as historic or current travel route distance, topography, and the like. By taking into account one or more such parameters, the controller can optimize its use of the hybrid power plant to meet or exceed the driver's goals of ride comfort, safety, fuel conservation, destination arrival time, preferred route, operating cost, etc.

Stand-Up Control Algorithm

Broadly speaking, those of skill in the art will appreciate that the vehicle stand-up control system 1150 in accordance with one embodiment of the invention governs degree of lean, if desired, during travel, slow-down, and stop. During normal travel, the controller can operate the stand-up mechanism to control the amount of lean at various vehicles speeds, for example, such that the vehicle's lean does not exceed a certain number of degrees for each of a set of vehicle speed ranges. (Similarly, the amount of effective hybrid power plant throttle can be controlled based upon a given throttle control torque, thereby limiting operational vehicle speed for training or safety purposes.) Further, in another embodiment a convenient pushbutton can be provided on the vehicle, e.g. for the driver's foot, permitting the vehicle to be stood up via the stand-up mechanism, if desired, as the driver comes to a stop or near stop, thereby increasing the safety for the rider. For example, if the vehicle leans too much around a tight but slow curve with a less experienced driver, the controller can assist the driver safely around the corner by activating the stand-up mechanism to a defined extent that prevents tipping of the vehicle. Such can be used by a novice driver during a desired training period as the driver develops cornering confidence, like selectively deployable training wheels without the training wheels.

The following outlines one embodiment of the stand-up control algorithm.

The stand-up control 1150 in FIG. 10 enables a fully enclosed vehicle that can operate like a typical motorcycle. Rather than the driver putting his/her feet down when stopped, during difficult low-speed maneuvers, or in emergencies, the system uses electronics and mechanical systems, and the two front wheels, to hold the body and passenger(s) in the appropriate position.

The system is controlled by a computer with inputs from various sensors and switches: electronic gyro 1102, paddle encoder 1104, 3-axis accelerometer 1106, low-speed speedometer 1108, driver expertise switch 728, steering encoder 1112, speedometer 1122, and forward/reverse switch 738.

In one embodiment, the algorithm works as follows:

The electronic gyro indicates acceleration in the Y (left-right, lateral) dimension. This indicates tilting/leaning of the body of the vehicle relative to a) gravity (when stopped or going straight) or b) relative to 'virtual gravity' when turning (the vector sum of gravity plus the lateral accelerations caused by turning). The electronic gyro is mounted on the body of the vehicle, and thus tilts with the body of the vehicle. This means that the Y vector is tilted around turns. In a perfect, balanced turn, the lean of the vehicle is such that the Y vector is orthogonal to the apparent downward force (virtual gravity described above), thus the sensor shows Y acceleration to be zero.

Stop:

When the vehicle is stopped, the mechanical system adjusts the vehicle's position (left-right tilt) so that this Y acceleration is near zero. This means the vehicle is held in an upright position (relative to gravity), regardless of the pitch of the road.

Launch:

When the vehicle begins to accelerate (above a defined minimal speed and acceleration threshold), the system releases the mechanical stand-up device, such as opening the free-to-lean valve 1514, allowing a certain amount of Y acceleration (with that amount dependent on speed, increasing with more speed). If the driver intends to make a turn immediately after launching the vehicle, this allowed Y acceleration enables the driver to counter-steer slightly, leaning (inducing a tilt in) the vehicle, preparing for a balanced turn.

If the driver fails then to steer into the turn to establish a balanced turn, then the Y acceleration will increase as the vehicle continues to lean toward a fall. This Y acceleration would exceed the allowed level, and the system would engage the mechanical stand-up device to prevent the vehicle from falling, proceeding (over time and depending on the corrections made by the driver) to lift the vehicle toward the position where Y acceleration is back within the allowed amount. (Referred to herein as situation #1.)

At Speed:

If the driver has steered correctly and the vehicle continues to accelerate, it reaches a speed threshold ($T_a$) ('a' for accelerating) above which any level of Y acceleration is allowed (the vehicle is 'free to lean').

Stopping:

Below a certain speed threshold ($T_d$) ('d' for decelerating), when the vehicle is decelerating, the system uses a similar relationship between the allowed Y acceleration and speed (less Y acceleration allowed as speed decreases). As the vehicle approaches zero speed, the amount of allowed Y acceleration is reduced to near zero, and if the driver is not positioning the vehicle toward a balanced stop, the system will assist toward a balanced stop.

Emergency Stop:

Example: the vehicle is going around a right-hand turn on a city street; a pedestrian steps into the vehicle's path, requiring the vehicle to stop immediately (before the turn can be straightened and the vehicle can stop in an upright position).

As the vehicle decelerates, it will begin to fall into the turn (to the right). When the speed is (or decreases to) below $T_d$, the system will observe this falling as an increase in Y acceleration. Based on the relationship between speed and allowed Y acceleration, the stand-up control system will engage the mechanical stand-up mechanism, preventing further falling to the right, and, over time, lifting the vehicle toward a balanced position (where Y acceleration is near zero), depending on what corrections (changes in Y acceleration) the driver induces through steering and throttle.

Parameters:

The lower and upper thresholds, speed and acceleration relationships, and time parameters can all be revised based on the user's selection of skill level. In a learning or dynamic mode, these can also be dynamically adjusted by the system as a given rider demonstrates increasing familiarity with the vehicle—such as starts, stops, and turns executed with less and less need for engagement of the stand-up control.

Generally speaking, those of skill in the art will appreciate that the stand-up mechanism's operation determined by the controller in accordance with one embodiment of the invention is automatically activated during a roll to a stop, since the driver cannot easily place a foot down as is conventional in bringing a two-wheeled vehicle, e.g. a motorcycle, to a stop.

Figure 13:
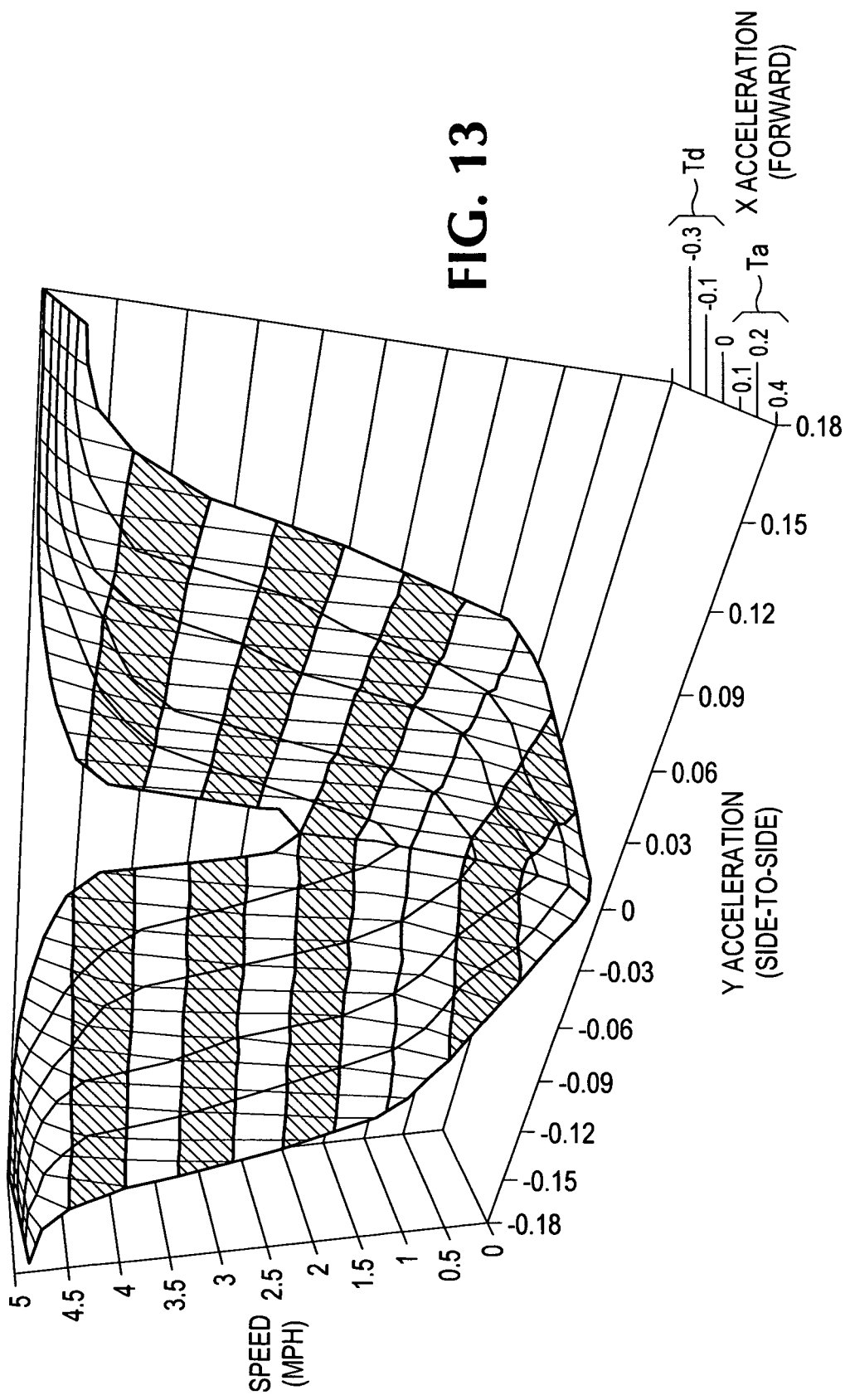
FIG. 13 is a diagram summarizing a combination of parameters for one possible embodiment of the stand-up control system, where the stand-up control is activated when the parameters define a point in 3D space below the surface, and not activated (free-to-lean) when the parameters define a point above the surface.

FIG. 13 is a diagram that combines some of these parameters into one example embodiment. This valley-shaped diagram can be read as follows: when the combination of sensor parameters defines a point below this surface, the stand-up control engages the hydraulic system to lift (tilt) the vehicle toward an upright position, or toward a position (lean angle) that is appropriate for the vehicle's current turn, speed, acceleration and terrain (bringing Y acceleration to near zero). The adjusted lean angle provided by the stand-up control system would result in parameter readings that define a point above this surface.

The surface shows that with increasing speed, the stand-up control system allows more Y acceleration (tilting) to occur without the hydraulic system engaging. Moreover, if the driver is accelerating, the valley shape widens earlier (at lower speeds), and if the driver is decelerating (such as coming to a stop), the valley shape narrows sooner (at a higher speed). Put another way, the stand-up control system monitors for proper lean angles more quickly as the vehicle comes to a stop, and allows natural leaning more quickly as the vehicle accelerates away from a stop.

The shape of the valley (the programming of parameter values) can be set such that most drivers rarely feel the stand-up control system engaging. As described above, in normal operation, the stand-up control system is mimicking the function of a two-wheeled motorcycle rider gently putting his or her foot on the ground at a stop, and raising that foot as he or she accelerates from a stop—with little or no lifting or tilting of the vehicle required.

The stand-up control system can be programmed to deploy the hydraulic lifting more aggressively if parameter readings define a point far below this surface, and more gently if the reading is barely below it. Alternatively, this sensitivity could be a function of the three-dimensional (3D) vector distance from (and beneath) the surface.)

The benefit of the algorithm's ability to use a surface like this is that it allows for smooth operation of the vehicle along this shape and these parameters, rather than a more discretely defined step function of these variables, which could cause jerky responses from the stand-up control and hydraulics. Other embodiments could use alternative combinations input measurements, parameters and surface shapes, or simplified threshold-based decisions, all within the spirit and scope of the invention.

Figure 11:
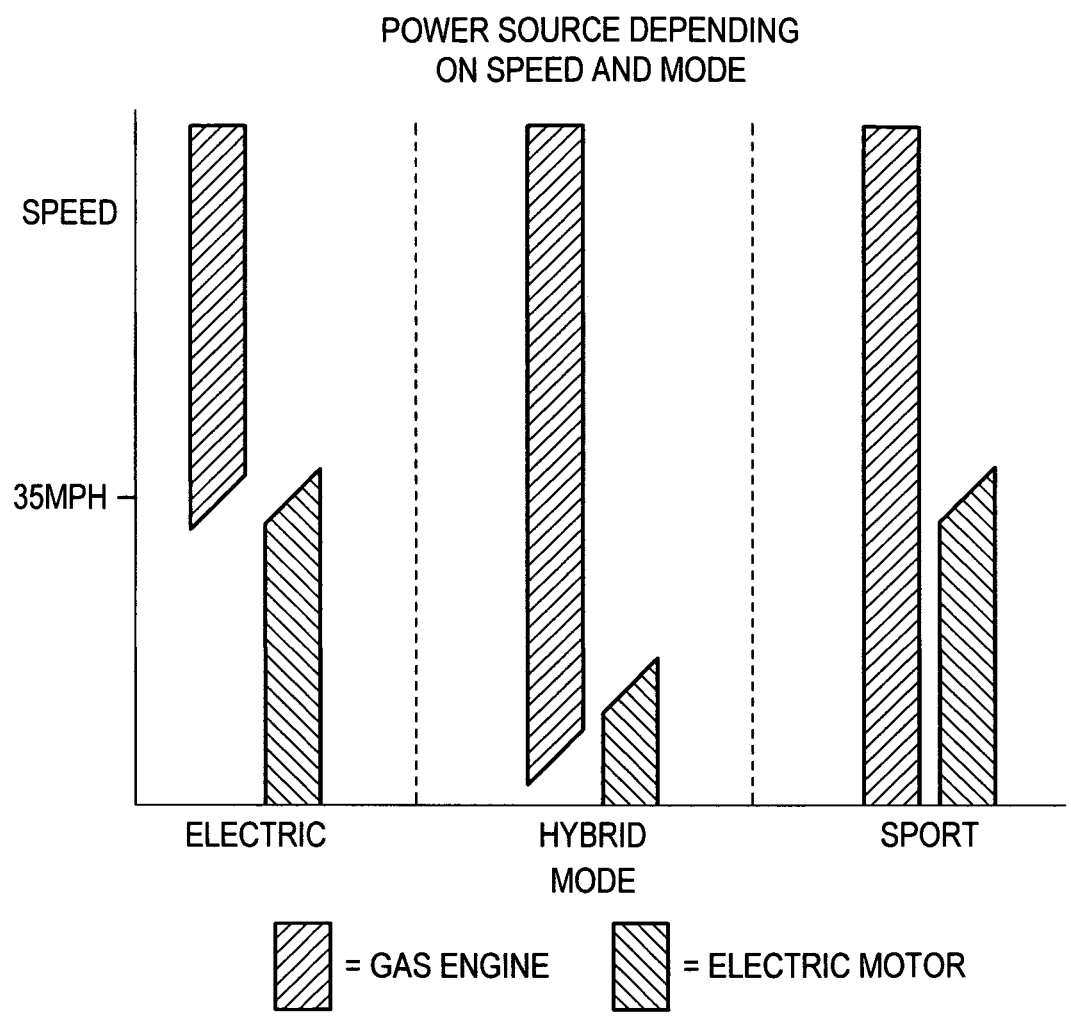
FIG. 11 is a graph illustrating some of the performance features of the invented vehicle's drive systems in accordance with one embodiment of the invention.

Software-only Hybrid Propulsion Algorithm (Power Control):

Broadly speaking, the power control system 1170 in accordance with one embodiment of the invention automatically shuts off the internal combustion engine when the vehicle is at a stop, e.g. a traffic stop sign or stop light, thereby conserving fuel. This operation can be accompanied for the safety of pedestrians in or about to enter crosswalks by an audible warning to alert the pedestrians that a vehicle is present at an intersection, as such lack of motor-running sounds from electric cars, for example, has been seen to confound and endanger some pedestrians who rely on their ears more than their eyes. The controller can also auto-restart the internal combustion engine upon sensing, for example, the degree of torque on the throttle, or upon reaching a threshold speed as shown in FIG. 11.

Also in accordance with one embodiment of the invention, the controller automatically adjusts the hybrid operation of the hybrid power plant, e.g. when it senses a low-fuel condition of the gas tank it decreases the vehicle's reliance on the internal combustion engine by smoothly transitioning to greater reliance on the vehicle's electric motor.

The controller in accordance with one embodiment of the invention senses the torque on the throttle and adjusts the hybrid operation in response thereto. For example, at relatively low torque, greater reliance on the electric motor may be used whereas, at relatively high torque, greater reliance is placed on the internal combustion engine.

The following outlines one embodiment of the software-only hybrid propulsion algorithm (power control 1170).

The hybrid propulsion system (power control 1170 in FIG. 10) enables a hybrid propulsion vehicle that gains the core advantages of a hybrid system (such as, 1) the electric drive system's better efficiency for launching and in stop-and-go driving situations, 2) the electric drive ability to efficiently capture braking energy (regenerative braking), and 3) the internal combustion engine's capability to provide high speeds and long range due to the fuel's high energy density) without the mechanical complexity of typical hybrid systems (such as mechanical power-split devices). Rather than using many custom mechanical components that are closely coupled to or built directly into the engine, electric motor, and other drive-train systems, and affect the design of those systems, this software-based system allows the use of existing internal combustion and electric drive systems and other components integrated in a novel way to achieve the majority of the benefits of more complex and customized designs.

The system is controlled by a computer with inputs from various sensors and switches: gas gauge 1116, battery charge level sensor 1118, throttle sensor 1120, speedometer 1122, low-speed speedometer 1108, mode switch (electric, hybrid, sport) 726, stand-up override switch 736, forward/reverse switch 738, front brake lever and sensor 716, rear brake lever and sensor 718, ignition switch 740, and other engine status sensors (RPM, temperature, etc.) 1124.

In one embodiment, the algorithm works as follows:

The throttle sensor enables a drive by wire system that takes the user's single throttle signal (twisting the throttle grip) and determines from that 'request for power' how to provide that power from the combination of the electric motor (motor) and the gas (or other internal combustion) engine (engine). The signal (request for power from the throttle) is processed and the power control unit then uses an electromechanical device to demand power from the engine (such as a servo pulling on a cable that provides an input to the engine similar to the pulling of a cable that would typically come directly from the throttle grip) and an electrical signal to demand power from the electric motor via the motor controller. The system also has access to the engine starter (and the engine 'kill switch'), enabling the engine to be turned off automatically when the vehicle is stopped, and re-started automatically when engine power is needed.

Hybrid Mode:

In typical driving, when the user desires high fuel economy with the ability to use the full speed range of the vehicle, the user will set the mode switch 726 to 'Hybrid'. This means the vehicle typically launches (from zero or low speed) mainly under electric drive from the motor. As the vehicle accelerates to a certain speed (or other parameter), the gas engine is then automatically throttled (or started and throttled) to provide more of the power required. Power is transitioned from the motor to the engine. This transition is indicated in FIG. 11 with the transitional wedge-shaped ends on the electric motor and gas engine power bands.

Electric Mode:

When the user desires the efficiency and low emissions of an electric vehicle for lower speed driving, the user selects the electric mode. This mode allows the vehicle to be powered solely from the electric motor from launch through mid-range speeds (such as 35 miles per hour, depending on the capability of the electric motor). At this point the power control system can either: a) automatically start and throttle the engine to provide power for the vehicle as additional power (speed) is required, or b) allow the vehicle's speed to top out at a certain speed (such as thirty-five mph) and continue using only electric power. (Option a or b may depend on an a pre-selected setting from the user about the function of the electric mode, and can also depend on the speed with which or the degree to which the user twists the throttle grip, with an aggressive twist indicating to the power control that the user wants to accelerate beyond the electric motor's speed level and into the gas engine's speed range.)

Sport Mode:

The user can also choose to have the added acceleration and performance of using both propulsion systems (the motor and the engine) at the same time from zero or very low speeds. This is done using the sport mode. In this mode, the engine typically does not shut off automatically when the vehicle is stopped; it remains on and available to provide immediate acceleration along with the acceleration from the electric motor. The two propulsion systems are used in parallel up to a certain speed (such as thirty-five miles per hour (35 mph), depending on the capability of electric motor), at which time the electric motor transitions to providing less or no power and the engine primarily takes the vehicle up to higher speeds.

Charging:

The power control also monitors the engine, speed, battery charge, gas level, and trip information and determines when the electric motor will be used as a generator, taking energy from the drive train to charge the batteries. This occurs when the engine is operating in its high-efficiency range of RPMs, torque, etc., depending on hills, power demand from the user, etc.

Regenerative Braking:

A sensor on the brake levers allows initial braking to be provided by the motor putting an electricity-generating load on rotation of the rear wheel. This load can be modulated based on how much the brake lever(s) are squeezed. If the brakes are squeezed quickly or beyond a certain range, the mechanical brakes are engaged.

FIG. 11 is a graph illustrating various operational profiles of the vehicle 10 in accordance with one embodiment of the invention. FIG. 11 illustrates vehicle speed on the vertical axis versus operational mode of the hybrid power source on the horizontal axis. Operation of the gas engine and electric motor are represented by contra-diagonal lining. It may be seen from FIG. 11 that there can be an overlap of power provision (with power provided by both sources, or power provision transitioning from one source to the other) around certain speeds, with such speed parameters programmable in the power control. In the electric mode of operation, it can be seen that the electric motor provides primary power for the vehicle up to speeds approaching (in one embodiment) 35 mph.

At this point the vehicle either a) ceases to accelerate if the throttle is in a moderate torque request position, or b) will start the gas engine and transition to gas power if the driver twists the throttle more aggressively (a high torque request). In the hybrid mode of operation, it may be seen that the electric motor provides primary power for launch and very low speeds, transitioning toward the gas engine beginning at approximately 3-5 mph, and completing the transition to primarily gas engine power at approximately 9-14 mph. Finally, in the sport mode of operation, it may be seen that there is concurrent operation of the electric motor and the gas engine until a transition at approximately 35 mph when the electric motor ceases to provide motive power.

The hybrid system and the intelligent power control system also provides other advantages. When the vehicle is out of gas the vehicle can proceed at a low speed on electric power, allowing the driver to get to more fuel or to a safe stopping point. Similarly, when the battery system charge is too low, the system can adjust the mix shown in FIG. 11, operating mainly or solely on gas power until the gas system can recharge the batteries, or until the vehicle can be plugged in for re-charging.

Integration of Stand-Up Control and Power Control:

In situations such as that described above (situation #1), where increased speed would exacerbate the excess Y acceleration (such as when the vehicle is steering to the left, and leaning toward the right (and being held or lifted to the left by the stand-up control), a situation those skilled in the art may call 'falling out of the turn'), the stand-up control will override the driver's speed requests, not allowing excessive speed that could cause the vehicle to tip.

When the power control is in reverse, the mechanical stand-up mechanism is always engaged, and speed is automatically limited.

These and other programmed uses of the invented vehicle controller are contemplated as being within the spirit and scope of the invention. Those of skill in the art will appreciate that the microprocessor within the controller can be programmed with a myriad of control algorithms that are invoked based automatically or semi-automatically on sensor inputs from various vehicle subsystems and operator controls or environmental or historic contexts, e.g. a stored driver profile that logs calendared and time-of-day-based driving and battery charging patterns, travel routes, and preferences.

Figure 12:
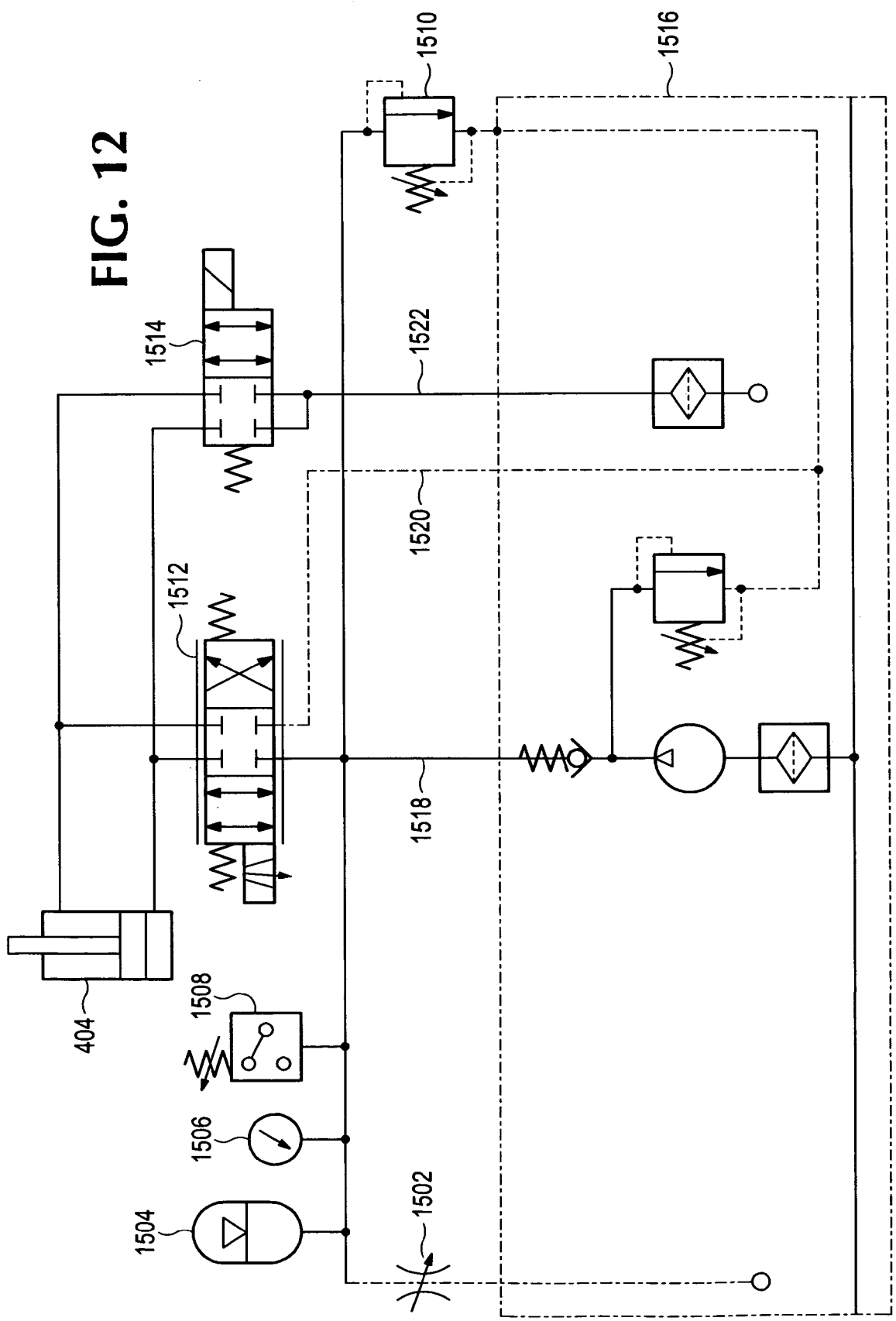
FIG. 12 is a schematic diagram of the hydraulic circuit that is controlled by the stand-up control system, featuring the hydraulic cylinder and the valves connected thereto, one of which controls the extension and contraction of the cylinder, and another which enables the cylinder to move freely.

FIG. 12 is a schematic diagram of one embodiment of the hydraulic circuit that is controlled by the stand-up control system. The hydraulic power unit 1516 includes both a pump and a reservoir that holds hydraulic fluid that the pump can access and that can receive fluid returned through various valves. The high pressure line 1518 carries hydraulic fluid under pressure to the directional proportional valve 1512. Depending on the signals sent from the stand-up control 1150, the directional proportional valve 1512 can be either a) closed, b) set to send pressure to the piston end of the cylinder 404 (causing the piston to extend), or c) set to send pressure to the non-piston end of the cylinder 404 (causing the piston to retract). Further, the valve is proportional, allowing control of the amount of fluid flowing in case b) or c) above. Thus the signals from the stand-up control 1150 to the directional proportional valve 1512 allow the stand-up control to a) hold the vehicle at the current lean angle, b) apply force to lean the vehicle to the left, or c) apply force to lean the vehicle to the right.

This control requires the free-to-lean valve 1514 to be closed. If, instead, the free-to-lean valve 1514 is opened and the directional proportional valve 1512 is closed, then the hydraulic piston can freely extend or contact within the cylinder. This allows the vehicle to freely lean to the left or right in response to the driver's steering, weight, etc. In an alternative embodiment, the free to lean valve can be split into two valves, one that can be closed to prevent further leaning to the right, and one that can be closed to prevent further leaning to the left, all within the spirit and scope of the invention.

The hydraulic pressure accumulator 1504 holds hydraulic pressure so that the hydraulic pump only works when system pressure falls below a certain level, such as 1200 pounds per square inch. When the pressure falls below this set level, the pressure switch 1508 signals the hydraulic unit to again supply more pressure to bring system pressure back up to a certain level, such as fifteen hundred pounds per square inch (1500 psi). This use of a hydraulic pressure accumulator 1504 reduces the number of times the hydraulic power unit 1516 needs to run, making the system quieter, extending system life, and potentially saving energy. Alternatively, this pressure control can be managed electronically using a computer or microprocessor to optimize energy use by the hydraulic pump, also within the spirit and scope of the invention.

The free-to-lean valve 1514 shown can be replaced with a proportional valve, which can be partially closed such that the system can be momentarily only partially free-to-lean. This temporary partial resistance to leaning, pulsing at a high frequency, is an alternative method to dampen oscillation in the front wheels as described above.

The front-wheel oscillation dampening capability of this design is an essential capability and one not enabled by designs of other three-wheeled leaning vehicles such as those described and illustrated by Mighell in U.S. Pat. No. 7,487,985 referenced in the Background section above. Until such a free-leaning vehicle is tested, the necessity for such a capability is not even apparent, as with other un-anticipatable vibration effects, which can even occur in two-wheeled motorcycles. But the effect can definitely cause driver distraction, and could even result in a loss of traction or control—making this dampening capability a core requirement for any multi-use, multi-condition, robust vehicle with a natural leaning design.

In summary, the invention enabled herein provides a three-wheeled vehicle that has the natural ride and energy efficiency advantages of a natural-leaning vehicle, but with the added benefit of automatically standing upright or correcting a lean angle when necessary. This, in turn, enables the vehicle to have a full enclosure for comfort and safety. That enclosure is further enhanced by the inclusion of ultra-strong safety beams, combining steel and composite materials in a manner that is both lightweight and inexpensive. Further, the light, safe, small-footprint vehicle is powered by a simple hybrid drive system that leverages the efficiency benefits of electric power for frequent start and stop driving situations, and uses the very high energy density of gasoline or other liquid fuels to provide long range and freeway cruising. Separately, these innovations enable advances in a broad range of vehicle applications. Taken together, they enable a new category of small, efficient, safe vehicles to become a commercial reality.

With over 72% of petroleum use in the U.S. going to transportation (U.S. Department of Energy (DOE)), dramatic vehicle efficiency innovations like this are an important tool in addressing the country's energy independence and carbon footprint reduction goals.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope of the invention.

Finally, those of skill in the art will appreciate that the invented method, system and apparatus described and illustrated herein may be implemented in software, firmware or hardware, or any suitable combination thereof. Preferably, the method, system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A three-wheeled leaning passenger vehicle comprising:
a frame rigidly mounting a driver seat;
a drive wheel rotatably mounted on the frame;
a frame-mounted rotary drive cooperatively coupled with the drive wheel for rotation of the drive wheel relative to the frame; and
a frame-mounted steer system including two wheels rotatable relative to the frame in a forward region thereof, and a handlebar coupled with the two rotatable wheels for turning the two rotatable wheels substantially parallel with one another to corner,
the vehicle being configured to substantially freely lean left and right in a natural leaning response to a driver thereof in the driver seat steering and leaning respectively left and right,
the vehicle being further equipped wherein the free leaning of the vehicle is selectively inhibited or controlled by an automatic stand-up mechanism to control the lean of the vehicle as necessary such as at stops, low speeds, emergency situations, or to assist the driver in attaining a desired lean of the vehicle,
wherein the rotary drive includes a frame-mounted power plant operatively couple-able with the drive wheel, the rotary drive including an internal combustion engine and an electric motor selectively operatively couple-able with the drive wheel to power the vehicle.

2. The vehicle of claim 1, wherein the steer system further includes left and right upper and lower A-arms having pivot points on the inner ends thereof, wherein the pivot points of the upper A-arms are concentric with one another, wherein the pivot points of the lower A-arms are concentric with one another, and wherein the pivot points of each are co-planar with one another and also with a central plane longitudinal of the vehicle.

3. The vehicle of claim 2, wherein the frame includes a nominally upright tower configured for leaning and an upright knuckle configured substantially not to lean relative to the vehicle's nominally horizontal suspension, and wherein the stand-up mechanism includes a pneumatic or hydraulic drive cylinder operatively coupled between the knuckle and the left and right A-arms to produce pivotal action therebetween.

4. The vehicle of claim 1, wherein the power plant is selectively operable to power the vehicle in three modes of operation including a sport mode characterized by operation of the internal combustion engine and the electric motor, an electric-only mode characterized by operation only of the electric motor, and a hybrid mode characterized by selective operation of the internal combustion engine and the electric motor to optimize performance and efficiency.

5. The vehicle of claim 1 further comprising:
a torque converter operatively coupled with the electric motor and the rear wheel, the torque converter being configured to engage the electric motor thereby to accommodate power and electrical requirements of the electric motor.

6. The vehicle of claim 5 further comprising:
a manual throttle; and
a controller operatively coupled with the torque converter and with the manual throttle, the controller providing automatic software programmed control of the electric motor and of the internal combustion engine to control a hybrid operating mode of the vehicle.

7. The vehicle of claim 1, wherein the operation of the vehicle is further characterized by regenerative braking to charge a battery that is operatively coupled with the electric motor.

8. A three-wheeled leaning passenger vehicle comprising:
a frame rigidly mounting a driver seat;
a drive wheel rotatably mounted on the frame;
a frame-mounted rotary drive cooperatively coupled with the drive wheel for rotation of the drive wheel relative to the frame; and
a frame-mounted steer system including two wheels rotatable relative to the frame in a forward region thereof, and a handlebar coupled with the two rotatable wheels for turning the two rotatable wheels substantially parallel with one another to corner,
the vehicle being configured to substantially freely lean left and right in a natural leaning response to a driver thereof in the driver seat steering and leaning respectively left and right,
the vehicle being further equipped wherein the free leaning of the vehicle is selectively inhibited or controlled by an automatic stand-up mechanism to control the lean of the vehicle as necessary such as at stops, low speeds, emergency situations, or to assist the driver in attaining a desired lean of the vehicle,
wherein the automatic stand-up mechanism is configured to provide virtual, true, and active G-force controls based upon inputs including one or more of vehicle speed, acceleration, lateral G force, and leaning orientation.

9. The vehicle of claim 8, wherein the automatic stand-up mechanism maintains the vertical plane when the vehicle is stopped or in reverse.

10. The vehicle of claim 9, wherein the automatic stand-up mechanism maintains the vertical plane when the vehicle is operating under a predefined speed or when a switch is activated by the driver.

11. The vehicle of claim 8, wherein the automatic stand-up mechanism includes a pneumatic or hydraulic cylinder that is configured to provide active variable tension-compression controllable to dampen resonant oscillation even during high-speed vehicle operation.

12. The vehicle of claim 11, wherein the cylinder extends at an angle relative to a substantially horizontal lower expanse of a suspension and hydraulic knuckle.

13. The vehicle of claim 12, wherein the cylinder extends at an angle of between approximately 40° and approximately 140°.

14. The vehicle of claim 13, wherein the cylinder includes bilateral physical stops and provides substantially symmetric tension-compression.

15. A three-wheeled leaning passenger vehicle comprising:
a frame rigidly mounting a driver seat;
a drive wheel rotatably mounted on the frame;
a frame-mounted rotary drive cooperatively coupled with the drive wheel for rotation of the drive wheel relative to the frame;
a frame-mounted steer system including two wheels rotatable relative to the frame in a forward region thereof, and a handlebar coupled with the two rotatable wheels for turning the two rotatable wheels substantially parallel with one another to corner; and a leaning mechanism including a nominally vertical tower pivotally mounting an end of a pneumatic or hydraulic cylinder that forms a part of the automatic stand-up mechanism, the tower being disposed generally in a central region of the leaning mechanism corresponding with the vehicle's central longitudinal and nominally vertical axes, the vehicle being configured to substantially freely lean left and right in a natural leaning response to a driver thereof in the driver seat steering and leaning respectively left and right, the vehicle being configured further such that the free leaning of the vehicle is selectively inhibited or controlled by an automatic stand-up mechanism to control the lean of the vehicle as necessary such as at stops, low speeds, emergency situations, or to assist the driver in attaining a desired lean of the vehicle.

16. A three-wheeled leaning passenger vehicle comprising:

a frame rigidly mounting a driver seat;

a drive wheel rotatable mounted on the frame;

a frame-mounted rotary drive cooperatively coupled with the drive wheel for rotation of the drive wheel relative to the frame; and a frame-mounted steer system including two wheels rotatable relative to the frame in a forward region thereof, and a handlebar coupled with the two rotatable wheels for turning the two rotatable wheels substantially parallel with one another to corner, the vehicle being configured to substantially freely lean left and right in a natural leaning response to a driver thereof in the driver seat steering and leaning respectively left and right, the vehicle being further equipped wherein the free leaning of the vehicle is selectively inhibited or controlled by an automatic stand-up mechanism to control the lean of the vehicle as necessary such as at stops, low speeds, emergency situations, or to assist the driver in attaining a desired lean of the vehicle, wherein the vehicle is configured to lean substantially at least approximately 40° left and right relative to a central plane of the vehicle.

17. A three-wheeled leaning passenger vehicle comprising:

a frame rigidly mounting a driver seat;

a drive wheel rotatable mounted on the frame;

a frame-mounted rotary drive cooperatively coupled with the drive wheel for rotation of the drive wheel relative to the frame;

a frame-mounted steer system including two wheels rotatable relative to the frame in a forward region thereof, and a handlebar coupled with the two rotatable wheels for turning the two rotatable wheels substantially parallel with one another to corner, and a body mounted to the frame, the body configured and dimensioned substantially to enclose one or more passengers within the vehicle, one of which passengers is also the driver of the vehicle, the vehicle being configured to substantially freely lean left and right in a natural leaning response to a driver thereof in the driver seat steering and leaning respectively left and right, the vehicle being further equipped wherein the free leaning of the vehicle is selectively inhibited or controlled by an automatic stand-up mechanism to control the lean of the vehicle as necessary such as at stops, low speeds, emergency situations, or to assist the driver in attaining a desired lean of the vehicle.

18. A three-wheeled leaning passenger vehicle comprising:

a frame rigidly mounting two or more seats, wherein the two or more seats are collectively configured to seat plural passengers one of which is also a driver of the vehicle;

a drive wheel rotatably mounted on the frame;

a frame-mounted rotary drive cooperatively coupled with the drive wheel for rotation of the drive wheel relative to the frame;

a frame-mounted steer system including two wheels rotatable relative to the frame in a forward region thereof, and a handlebar coupled with the two rotatable wheels for turning the two rotatable wheels substantially parallel with one another to corner, and the vehicle being configured to substantially freely lean left and right in a natural leaning response to a driver thereof in the driver seat steering and leaning respectively left and right, the vehicle being further equipped wherein the free leaning of the vehicle is selectively inhibited or controlled by an automatic stand-up mechanism to control the lean of the vehicle as necessary such as at stops, low speeds, emergency situations, or to assist the driver in attaining a desired lean of the vehicle.

19. A three-wheeled leaning passenger vehicle comprising:

a frame rigidly mounting a driver seat;

a drive wheel rotatably mounted on the frame;

a frame-mounted rotary drive cooperatively coupled with the drive wheel for rotation of the drive wheel relative to the frame;

a frame-mounted steer system including two wheels rotatable relative to the frame in a forward region thereof, and a handlebar coupled with the two rotatable wheels for turning the two rotatable wheels substantially parallel with one another to corner, and a body rigidly mounted to the frame, wherein the body includes a framework mounting a rigid passenger enclosure therearound, the framework including one or more substantially straight tubular members fixedly attached to one or more curved tubular members, the substantially straight and curved members collectively configured rigidly to mount the passenger enclosure to the frame, the vehicle being configured to substantially freely lean left and right in a natural leaning response to a driver thereof in the driver seat steering and leaning respectively left and right, the vehicle being further equipped wherein the free leaning of the vehicle is selectively inhibited or controlled by an automatic stand-up mechanism to control the lean of the vehicle as necessary such as at stops, low speeds, emergency situations, or to assist the driver in attaining a desired lean of the vehicle.

20. The vehicle of claim 19, wherein at least one of the one or more substantially straight tubular members is substantially filled with a durable rigid lightweight filler material.

21. The vehicle of claim 20, wherein the material takes the form of a fibrous carbon rod inserted into hollow regions of the at least one of the one or more substantially straight tubular members.

22. A three-wheeled leaning passenger vehicle comprising:
- a frame rigidly mounting a driver seat;
- a drive wheel rotatably mounted on the frame;
- a frame-mounted rotary drive cooperatively coupled with the drive wheel for rotation of the drive wheel relative to the frame; and
- a frame-mounted steer system including two wheels rotatable relative to the frame in a forward region thereof, and a handlebar coupled with the two rotatable wheels for turning the two rotatable wheels substantially parallel with one another to corner, wherein the steer system further includes left and right upper and lower A-arms having pivot points on the inner ends thereof, wherein the pivot points of the upper A-arms are concentric with one another, wherein the pivot points of the lower A-arms are concentric with one another, and wherein the pivot points of each are co-planar with one another and also with a central plane longitudinal of the vehicle,
- the vehicle being configured to substantially freely lean left and right in a natural leaning response to a driver thereof in the driver seat steering and leaning respectively left and right,
- the vehicle being further equipped wherein the free leaning of the vehicle is selectively inhibited or controlled by an automatic stand-up mechanism to control the lean of the vehicle as necessary such as at stops, low speeds, emergency situations, or to assist the driver in attaining a desired lean of the vehicle.

* * * * *